United States Patent
Zou et al.

(10) Patent No.: US 9,906,799 B2
(45) Date of Patent: Feb. 27, 2018

(54) COPY FROM PREVIOUS ROWS FOR PALETTE MODE CODING

(71) Applicant: QUALCOMM Incorporated, San Diego, CA (US)

(72) Inventors: Feng Zou, San Diego, CA (US); Marta Karczewicz, San Diego, CA (US); Joel Sole Rojals, San Diego, CA (US); Rajan Laxman Joshi, San Diego, CA (US); Wei Pu, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 14/743,898

(22) Filed: Jun. 18, 2015

(65) Prior Publication Data

US 2015/0373339 A1    Dec. 24, 2015

Related U.S. Application Data

(60) Provisional application No. 62/015,177, filed on Jun. 20, 2014, provisional application No. 62/018,477, (Continued)

(51) Int. Cl.
*H04N 19/105* (2014.01)
*H04N 19/176* (2014.01)
(Continued)

(52) U.S. Cl.
CPC ......... *H04N 19/176* (2014.11); *H04N 19/105* (2014.11); *H04N 19/186* (2014.11); (Continued)

(58) Field of Classification Search
CPC .................................................. H04N 19/176
(Continued)

(56) References Cited

U.S. PATENT DOCUMENTS 5,796,864 A    8/1998  Callahan
6,008,816 A    12/1999 Eisler et al.
(Continued)

FOREIGN PATENT DOCUMENTS

WO    2014165789 A1    10/2014

OTHER PUBLICATIONS

Chen et al., "Description of screen content coding technology proposal by Qualcomm", Apr. 4, 2014, Joint Collaborative Team on Video Coding (JCT-VC) of ITU-T SG16 WP3 and ISO/IEC JTC1/SC29/WG11, 17th Meeting, JCTVC-Q0031.*
(Continued)

*Primary Examiner* — Christopher S Kelley
*Assistant Examiner* — Asmamaw G Tarko
(74) *Attorney, Agent, or Firm* — Shumaker & Sieffert, P.A.

(57) ABSTRACT

An example method of decoding video data includes determining a palette for decoding a block of video data, where the palette includes one or more palette entries each having a respective palette index, determining a first plurality of palette indices for first pixels of the block of video data, enabling a palette coding mode based on a run length of a run of a second plurality of palette indices for second pixels of the block of video data being decoded relative to the first plurality of palette indices meeting a run length threshold, and decoding the run of the second plurality of palette indices relative to the first plurality of palette indices using the palette coding mode.

23 Claims, 10 Drawing Sheets

Related U.S. Application Data filed on Jun. 27, 2014, provisional application No. 62/060,485, filed on Oct. 6, 2014.

(51) Int. Cl.

| | |
|---|---|
| *H04N 19/186* | (2014.01) |
| *H04N 19/593* | (2014.01) |
| *H04N 19/93* | (2014.01) |
| *H04N 19/70* | (2014.01) |
| *H04N 19/48* | (2014.01) |
| *H04N 19/587* | (2014.01) |
| *H04N 19/119* | (2014.01) |
| *H04N 19/182* | (2014.01) |

(52) U.S. Cl.
CPC ........... *H04N 19/48* (2014.11); *H04N 19/593* (2014.11); *H04N 19/70* (2014.11); *H04N 19/93* (2014.11); *H04N 19/119* (2014.11); *H04N 19/182* (2014.11); *H04N 19/587* (2014.11)

(58) Field of Classification Search
USPC .................................................... 375/240.24
See application file for complete search history.

(56) References Cited

U.S. PATENT DOCUMENTS

| | | | |
|---|---|---|---|
| 6,574,372 | B2 | 6/2003 | Ratnakar |
| 6,748,116 | B1* | 6/2004 | Yue .......................... G06T 9/004 382/238 |
| 7,343,037 | B1 | 3/2008 | Kadatch |
| 7,343,837 | B1 | 3/2008 | Domanico et al. |
| 2003/0048943 | A1* | 3/2003 | Ishikawa ................ G06T 9/005 382/166 |
| 2003/0093817 | A1 | 5/2003 | Lee |
| 2003/0169932 | A1* | 9/2003 | Li ............................. G06T 9/00 382/239 |
| 2004/0151372 | A1 | 8/2004 | Reshetov et al. |
| 2006/0184705 | A1 | 8/2006 | Nakajima |
| 2010/0046628 | A1 | 2/2010 | Bhaskaran et al. |
| 2011/0110416 | A1 | 5/2011 | Lawrence |
| 2014/0301474 | A1 | 10/2014 | Guo et al. |
| 2014/0301475 | A1* | 10/2014 | Guo ....................... H04N 19/50 375/240.24 |
| 2015/0016501 | A1 | 1/2015 | Guo et al. |
| 2015/0146976 | A1 | 5/2015 | Ma et al. |
| 2015/0264348 | A1* | 9/2015 | Zou ...................... H04N 19/593 375/240.02 |
| 2015/0264362 | A1* | 9/2015 | Joshi ...................... H04N 19/18 375/240.18 |
| 2015/0373340 | A1 | 12/2015 | Zou et al. |

OTHER PUBLICATIONS

Zhang et al. " 'AHG7: An efficient coding method for DLT in 3D-HEVC', 5th Meeting: Vienna, AT, Jul. 27-Aug. 2, 2013; Document: JCT3V-E0176; Joint Collaborative Team on 3D Video Coding Extension Development of ITU-T SG 16 WP 3 and ISO/IEC JTC 1/SC 29/WG 11".*
Wiegand et al., "WD1: Working Draft 1 of High-Efficiency Video Coding," JCTVC-C403, 3rd Meeting: Guangzhou, CN, Oct. 7-15, 2010 (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011 (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011 (Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16); JCTVC-F803_d2, Oct. 4, 2011, 226 pp.
Bross et al., "WD5: Working Draft 5 of High-Efficiency Video Coding," 7th Meeting: Geneva, CH, Nov. 21-30, 2011 (Joint Collaborative Team on Video Coding of ISO/IEC JTC1/SC29/SG11 and ITU-T SG.16); JCTVC-G1103_d2, Dec. 30, 2011, 214 pp.
Bross et al., "High Efficiency video coding (HEVC) text specification draft 6," 8th Meeting: San Jose, CA, USA, Feb. 1-10, 2012 (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012 (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012 (Joint Collaborative Team on Video Coding of ISO/IEC JTC1/SC29/WG11 and ITU-T SG.16); JCTVC-J1003_d7, Jul. 28, 2012, 261 pp.
Bross et al., "High Efficiency Video Coding (HEVC) text specification draft 9," 11th Meeting: Shanghai, CN, Oct. 10-19, 2012 (Joint Collaborative Team on Video Coding of ISO/IEC JTC1/SC29/WG11 and ITU-T SG.16); JCTVC-K1003_v7, Nov. 2, 2012, 290 pp.
Bross et al., "High Efficiency Video Coding (HEVC) text specification draft 10 (for FDIS & Last Call)," 12th Meeting: Geneva, CH, Jan. 14-23, 2013 (Joint Collaborative Team on Video Coding of ISO/IEC JTC1/SC29/ VG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen et al., "Description of screen content coding technology proposal by Qualcomn," JCT-VC Meeting; Valencia, ES (Joint Collaborative Team on Video Coding of ISO/IEC JTC1/SC29/WG11 and ITU-T SG.16), No. JCTVC-Q0031, Mar. 28, 2014, XP030115916, 19 pp.
Lin et al., "Compound Image Compression for Real-Time Computer Screen Image Transmission," IEEE Transactions on Image Processing, IEEE Service Center, Piscataway, NJ, US, vol. 14, No. 8; Aug. 2005, XP011136219, ISSN: 1057-7149, DOI:10.1109/TIP.2005.849776, pp. 993-1005.
Lan et al., "Compress Compound Images in H.264/MPGE-4 AVC by Exploiting Spatial Correlation," IEEE Transactions on Image Processing, IEEE Service Center, Piscataway, NJ, US, vol. 19, No. 4, Apr. 2010, XP011298469, ISSN: 1057-7149, pp. 946-957.
Lan et al., "Intra and inter coding tools for screen contents," IEEE Service Center, No. JCTVC-E145, Mar. 16-23, 2011, XP030008651, 11 pp.
Murray et al., "Run-Length Encoding (RLE)," Encyclopedia of Graphics File Formats (2nd Edition), Apr. 1996, KP55126024, ISBN: 978-1-56 592161-0, [retrieved on Jun. 30, 2014], 9 pp.
Guo et al., "Palette Mode for Screen Content Coding," 13th Meeting, Apr. 18-26, 2013, Incheon, KR (Joint Collaborative Team

(56) References Cited

OTHER PUBLICATIONS on Video Coding of ISO/IEC JTC1/SC29/WG11 and ITU-T SG.16), Document: JCTVC-M0323, 12 pp.
Lan et al., "Compression of Compound Images by Combining Several Strategies," IEEE Service Center, Oct. 17-19, 2011, 6 pp.
Lan et al., "Screen content coding," 2nd Meeting, Jul. 21-28, 2010, Geneva, CH (Joint Collaborative Team On Video Coding of ISO/IEC JTC1/SC29NVG11 and ITU-T SG.16), Document: JCTVC-B084_r1, 10 pp.
Guo et al.,"RCE4: Results of Test 2 on Palette Mode for Screen Content Coding," JCT-VC Meeting; San Jose, CA, USA (Joint Collaborative Team on Video Coding of ISO/IEC JTC1/SC29/WG11 and ITU-T SG.16 ); URL: http://wftp3.itu.int/av-arch/jctvc-site/, No. JCTVC-P0198-v3, Jan. 8, 2014, XP030115731, 10 pp.
Ivanov et al., "Color Distribution—A New Approach to Texture Compression," Computer Graphics Forum, Wiley-Blackwell Publishing Ltd, GB, vol. 19, No. 3, Aug. 21, 2000, 8 pp.
Laroche et al., "Non-RCE4: Palette Prediction for Palette mode," 16th Meeting, JCT-VC Meeting; Jan. 9-17, 2014; San Jose, CA, USA (Joint Collaborative Team on Video Coding of ISO/IEC JTC1/SC29/WG11 and ITU-TSG.16 ); URL: http://wftp3.itu.int/av-arch/jctvc-site/, No. JCTVC-P0114, Jan. 10, 2014; 6 pp.
Zhu et al., "Template-based palette prediction," 13th Meeting, JCT-VC Meeting; Apr. 18-26, 2013; Incheon, KR (Joint Collaborative Team on Video Coding of ISO/IEC JTC1/SC29/WG11 and ITU-TSG.16 ); URL: http://wftp3.itu.int/av-arch/jctvc-site/, No. JCTVC-N0169, XP030114647, Jul. 15, 2013; 3 pp.
International Search Report and Written Opinion from International Application No. PCT/US2015/036707, dated Oct. 6, 2015, 15 pp.
Guo et al., "Non-RCE3: Modified Palette Mode for Screen Content Coding," JCT-VC Meeting; Jul. 25-Aug. 2, 2013, Vienna, AT (Joint Collaborative Team on Video Coding of ISO/IEC JTC1/SC29/WG11 and ITU-T SG.16 ), URL: http://wftp3.itu.int/av-arch/jctvc-site/, No. JCTVC-N0249, Jul. 16, 2013; XP030114767, 6 pp.
Chang et al., "AHG7: An efficient coding method for DLT in 3D-HEVC," 5th Meeting, JCT-3V Meeting; Jul. 27-Aug. 2, 2013; Vienna, AT (The Joint Collaborative Team on 3D Video Coding Extension Development of ISO/IEC JTC1/SC29/WG11 and ITU-T SG.16); URL: http://phenix.int-evry.fr/jct2/, No. JCT3V-E0176, Jul. 27, 2013; XP030131209, 5 pp.
Zou et al., "CE10: Test 7.1 Constrained run for Intra String Copy," JCT-VC Meeting, Oct. 17-24, 2014, Strasbourg, FR (Joint Collaborative Team on Video Coding of ISO/IEC JTC1/SC29/WG11 and ITU-T SG.16), URL: http://wftp3.itu.int/av-arch/jctvc-site/, No. JCTVC-S0175, XP030116955, 3 pp.
Zou et al., "CE6: Test C.3 Copy previous row mode for palette coding," JCT-VC Meeting, Oct. 17-24, 2014, Strasbourg, FR (Joint Collaborative Team on Video Coding of ISO/IEC JTC1/SC29/WG11 and ITU-T SG.16), URL: http://wftp3.itu.int/av-arch/jctvc-site/, No. JCTVC-S0174, XP030116953, Oct. 8, 2014; 5 pp.
Zou et al., "Non-SCCE3: Copy from previous row mode for palette coding," JCT-VC Metting; Jun. 30-Jul.9, 2014; Sapporo, JP (Joint Collaborative Team on Video Coding of ISO/IEC JTC1/SC29/WG11 and ITU-T SG.16), URL: http://wftp3.itu.int/av-arch/jctvc-site/ No. JCTVC-R0282-v4 Jul. 2, 2014; XP030116495, 3 pp.
Zou et al., "Non-SCCE4: Constrained run for 1D dictionary coding," JCT-VC Meeting; Jun. 30-Jul. 9, 2014; Sapporo, JP (Joint Collaborative Team on Video Coding of ISO/IEC JTC1/SC29/WG11 and ITU-T SG.16), URL: http://wftp3.itu.int/av-arch/jctvc-site/, No. JCTVC-R0225, Jul. 1, 2014; XP30116525, 4 pp.
Flynn et al., "High Efficiency Video Coding (HEVC) Range Extensions text specification: Draft 7," JCT-VC Meeting; Mar. 27-Apr. 4, 2014, Valencia, ES (Joint Collaborative Team on Video Coding of ISO/IEC JTC1/SC29/WG11 and ITU-T SG.16 ), No. JCTVC-Q1005_v4, Apr. 10, 2014; 376 pp.
Zou et al., "Non-SCCE3: Copy from previous row mode for palette coding," JCT-VC Meeting; Jun. 30-Jul. 9, 2014, Sapporo, JP (Joint Collaborative Team on Video Coding of ISO/IEC JTC1/SC29/WG11 and ITU-T SG.16); No. JCTVC-R0202 Jun. 21, 2014; 3 pp.
Pu et al., "Non-RCE4: Refinement of the palette in RCE4 Test 2," JCT-VC Meeting; Jan. 9-17, 2014; San Jose, CA, US (Joint Collaborative Team on Video Coding of ISO/IEC JTC1/SC29/WG11 and ITU-T SG.16 ); No. JCTVC-P0231, Jan. 7, 2014; 4 pp.
Response to Written Opinion dated Oct. 6, 2015, from International Application No. PCT/US2015/036707, filed on Apr. 20, 2016, 6 pp.
Huang et al., "Description of Core Experiment 6 (CE6): Imporvements of palette mode," JCT-VC Meeting, Jun. 30 through Jul. 9, 2014, Sapporo, JP; (Joint Collaborative Team on Video Coding (JCT-VC) of ITU-T SG16 WP3 and ISO/IEC JTC1/SC29/WG11); URL: http://wft93.itu.int/av-arch/jctvc-site/, No. JCTVC-R1106, 6 pp.
Huang et al., "Description of Screen Content Core Experiment 3 (SCCE3): Palette Mode," JCT-VC Meeting, Mar. 27-Apr. 4, 2014, Valencia, ES (Joint Collaborative Team on Video Coding of ISO/IEC JTC1/SC29/WG11 and ITU-T SG.16 ), URL: http://wftp3.itu.int/av-arch/jctvc-site/, No. JCTVC-Q1123, Apr. 18, 2014, 11 pp.
YU et al., "Common conditions for screen content coding tests," Joint Collaboration Team of Video Coding, ITU-T SG16 WP 3 and ISO/IEC JTC 1/SC 29/WG 11, Jun. 30-Jul. 9, 2014, Sapporo, JP Document JCTVC-R1015, 5 pp.
Second Written Opinion from International Application No. PCT/US215/036707, dated Jun. 14, 2016, 10 pp.
Response to Second Written Opinion dated Jun. 14, 2016, from International Application No. PCT/US2015/036707, filed on Aug. 12, 2016, 8 pp.
International Preliminary Report on Patentability from International Application No. PCT/US2015/036707, dated Oct. 6, 2016, 12 pp.
Lan C., et al., "Screen Content Coding", 2. JCT-VC Meeting; Jul. 21, 2010-Jul. 28, 2010; Geneva, CH; (Joint Collaborative Team on Video Coding of ISO/IEC JTC1/SC29/WG11 and ITU-T SG.16 ); URL: http://wftp3.1tu.int/av-arch/jctvcsite/, No. JCTVC-B084, Jul. 26, 2010, XP030007664, ISSN: 0000-004, 10 pp.
Laroche G., et al., "Non-RCE4: Palette Prediction for Palette mode", JCT-VC Meeting: Jan. 9-17, 2014; San Jose, CA; (Joint Collaborative Team on Video Coding of ISO/IEC JTC1/SC29/WG11 and ITU-TSG.16); URL: http://wftp3.itu.int/av-arch/jctvc-site/, No. JCTVC-P0114-v3, 6 pp.
Zhang (Mediatek) K et al., "AHG7: An efficient coding method for DLT in 3D-HEVC", 5. JCT-3V Meeting; Jul. 27, 2013-Aug. 2, 2013; Vienna, AT; (The Joint Collaborative Team on 3D Video Coding Extension Development of ISO/IEC JTC1/SC29/WG11 and ITU-T SG.16); URL: http://phenix.int-evry.fr/jct2/,,No. JCT3V-E0176-v3, Jul. 27, 2013 (Jul. 27, 2013), XP030131209, 5 pp.

* cited by examiner

COPY FROM PREVIOUS ROWS FOR PALETTE MODE CODING

This application claims the benefit of:
U.S. Provisional Application No. 62/015,177, filed 20 Jun. 2014;
U.S. Provisional Application No. 62/018,477, filed 27 Jun. 2014; and
U.S. Provisional Application No. 62/060,485, filed 6 Oct. 2014,
the entire contents of each of which are incorporated herein by reference.

TECHNICAL FIELD

This disclosure relates to video coding and compression, and in particular examples, to palette-based video/image coding methods.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, techniques of this disclosure relate to palette-based video coding. In palette-based coding, a video coder (e.g., a video encoder or a video decoder) may form a so-called "palette" as a table of colors or pixel values representing the video data of a particular area (e.g., a given block). In this way, rather than coding actual pixel values or their residuals for a current block of video data, the video coder may code color or palette index values for one or more of the pixels values of the current block, where the index values indicate entries in the palette that are used to represent the pixel values of the current block. A map of palette index values for a current block of video data may be coded line-by-line, using a given scan order and run-length coding techniques. Each of the index values in a given line of the map may be explicitly coded, or predicted from a left-mode index of the given line, or predicted from a collocated index in a line above the given line.

Various techniques of this disclosure are directed to enhancing existing palette-based coding techniques. In some aspects, this disclosure is directed to adding a palette-based coding mode (referred to herein as a "copy from previous rows" mode) that enables a video coding device to copy a palette index from a reference pixel that is positioned multiple rows above the current pixel being coded. This disclosure also includes techniques for coding mode-identifying information using a truncated unary code. For instance, the techniques enable a video coding device to use a unique truncated unary codeword to identify each of various palette-coding modes, including the copy from previous rows mode described herein.

In another example, this disclosure describes a video decoding device that includes a memory configured to store encoded video data and one or more processors. The one or more processors are configured to determine a palette for decoding a block of the encoded video data, where the palette includes one or more palette entries each having a respective palette index, determine a first plurality of palette indices for first pixels of the block of video data, and determine a second plurality of palette indices for second pixels of the block of video data based on the first plurality of palette indices. To determine the second plurality of palette indices, the one or more processors are configured to locate a reference index included in the first plurality of palette indices, where the reference index is spaced at least one line from an initial index of the second plurality of palette indices, determine a run length of a run of the first plurality of indices, where a final index of the run is separated in the block from the initial index of the second plurality of palette indices by at least one index, copy the first plurality of indices included in the run as the second plurality of palette indices, and decode a plurality of pixels of the block associated with the copied second plurality of palette indices using the palette.

In another example, this disclosure describes a computer-readable storage medium encoded with instructions that, when executed, cause one or more processors of a video decoding device to determine a palette for decoding a block of encoded video data, where the palette includes one or more palette entries each having a respective palette index, determine a first plurality of palette indices for first pixels of the block of video data; and determine a second plurality of palette indices for second pixels of the block of video data based on the first plurality of palette indices. To determine the second plurality of palette indices, the instructions, when executed, cause the one or more processors are configured to locate a reference index included in the first plurality of palette indices, where the reference index is spaced at least one line from an initial index of the second plurality of palette indices, determine a run length of a run of the first plurality of indices, where a final index of the run is separated in the block from the initial index of the second plurality of palette indices by at least one index, copy the first plurality of indices included in the run as the second plurality of palette indices, and decode a plurality of pixels of the block associated with the copied second plurality of palette indices using the palette.

In one example, this disclosure describes a method of decoding video data, the method including determining a palette for decoding a block of video data, where the palette includes one or more palette entries each having a respective palette index, determining a first plurality of palette indices for first pixels of the block of video data, and determining a second plurality of palette indices for second pixels of the block of video data based on the first plurality of palette indices. Determining the second plurality of palette indices includes locating a reference index included in the first plurality of palette indices, where the reference index is spaced at least one line from an initial index of the second plurality of palette indices, determining a run length of a run of the first plurality of indices, where a final index of the run is separated in the block from the initial index of the second plurality of palette indices by at least one index, copying the first plurality of indices included in the run as the second plurality of palette indices, and decoding a plurality of pixels of the block associated with the copied second plurality of palette indices using the palette.

In another example, this disclosure describes a method of encoding video data, the method including determining a palette for decoding a block of video data, where the palette includes one or more palette entries each having a respective palette index, determining a first plurality of palette indices for first pixels of the block of video data, and determining a second plurality of palette indices for second pixels of the block of video data based on the first plurality of palette indices. Determining the second plurality of palette indices includes locating a reference index included in the first plurality of palette indices, where the reference index is spaced at least one line from an initial index of the second plurality of palette indices, determining a run length of a run of the first plurality of indices, where a final index of the run is separated in the block from the initial index of the second plurality of palette indices by at least one index, copying the first plurality of indices included in the run as the second plurality of palette indices, and encoding a plurality of pixels of the block associated with the copied second plurality of palette indices using the palette.

In another example, this disclosure describes a method of decoding video data, the method including determining a palette for decoding a block of video data, where the palette includes one or more palette entries each having a respective palette index, determining a first plurality of palette indices for first pixels of the block of video data, enabling a palette coding mode based on a run length of a run of a second plurality of palette indices for second pixels of the block of video data being decoded relative to the first plurality of palette indices meeting a run length threshold, and decoding the run of the second plurality of palette indices relative to the first plurality of palette indices using the palette coding mode.

In another example, this disclosure describes a method of encoding video data, the method including determining a palette for decoding a block of video data, where the palette includes one or more palette entries each having a respective palette index, determining a first plurality of palette indices for first pixels of the block of video data, enabling a palette coding mode based on a run length of a run of a second plurality of palette indices for second pixels of the block of video data being encoded relative to the first plurality of palette indices meeting a run length threshold, and encoding the run of the second plurality of palette indices relative to the first plurality of palette indices using the palette coding mode.

In another example, this disclosure describes a device for decoding encoded video data that includes a memory configured to store encoded video data and one or more processors. The one or more processors are configured to determine a palette for decoding a block of the encoded video data, where the palette includes one or more palette entries each having a respective palette index, determine a first plurality of palette indices for first pixels of the block of video data, enable a palette coding mode based on a run length of a run of a second plurality of palette indices for second pixels of the block of video data being decoded relative to the first plurality of palette indices meeting a run length threshold, and decode the run of the second plurality of palette indices relative to the first plurality of palette indices using the palette coding mode.

In another example, this disclosure describes a computer-readable storage medium encoded with instructions that, when executed, cause one or more processors of a video decoding device to determine a palette for decoding a block of encoded video data, wherein the palette includes one or more palette entries each having a respective palette index, determine a first plurality of palette indices for first pixels of the block of video data, enable a palette coding mode based on a run length of a run of a second plurality of palette indices for second pixels of the block of video data being decoded relative to the first plurality of palette indices meeting a run length threshold, and decode the run of the second plurality of palette indices relative to the first plurality of palette indices using the palette coding mode.

The details of one or more examples are set forth in the accompanying drawings and the description below. Other features, objects, and advantages will be apparent from the description and drawings, and from the claims.

DETAILED DESCRIPTION

Figure 1:
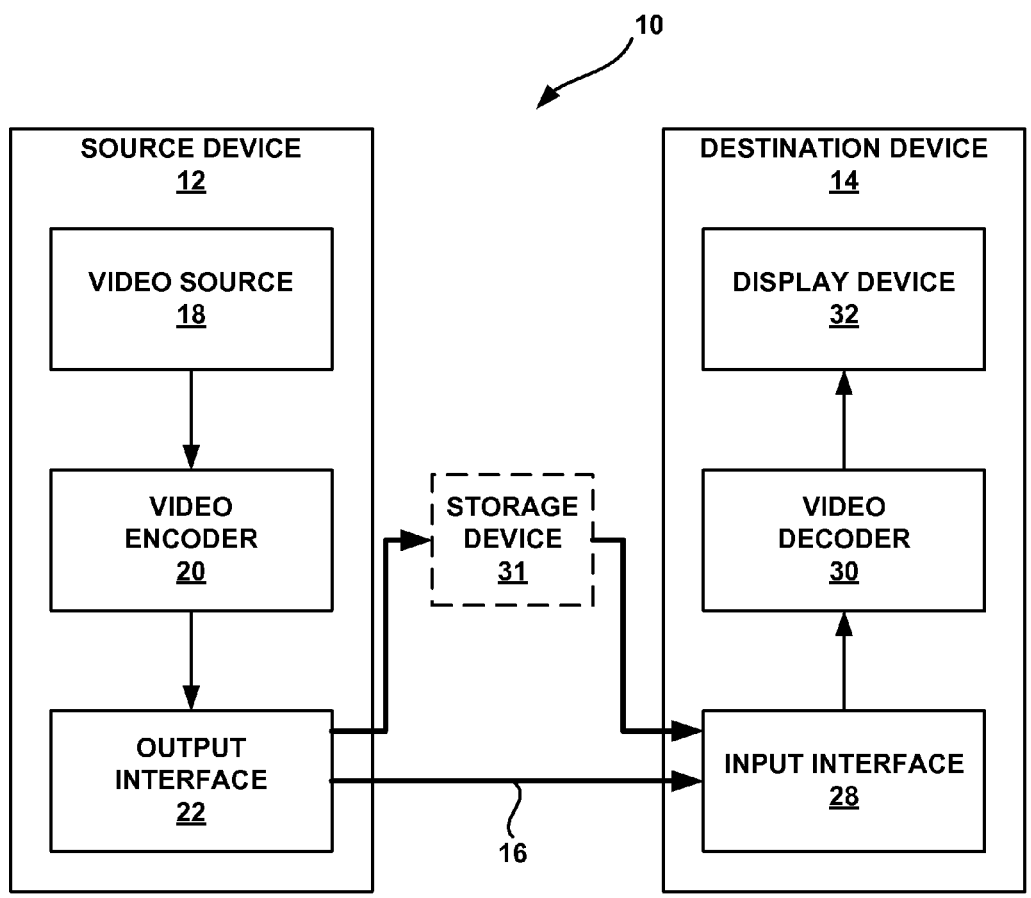
FIG. 1 is a block diagram illustrating an example video encoding and decoding system that may utilize techniques described in this disclosure for palette-based video coding. for depth oriented inter-view motion vector prediction in video coding.

This disclosure includes techniques for video coding and compression. In particular, this disclosure describes techniques for palette-based coding of video data. In traditional video coding, images are assumed to be continuous-tone and spatially smooth. Based on these assumptions, various tools have been developed, such as block-based transform, filtering, etc., and such tools have shown good performance for natural content videos.

In applications like remote desktop, collaborative work and wireless display, however, computer generated screen content (e.g., such as text or computer graphics) may be the dominant content to be compressed. This type of content tends to have discrete-tone, and feature sharp lines and high-contrast object boundaries. The assumption of continuous-tone and smoothness may no longer apply for screen content, and thus traditional video coding techniques may not be efficient ways to compress video data including screen content.

This disclosure describes palette-based coding, which may be particularly suitable for screen generated content coding or other content where one or more traditional coding tools are inefficient. The techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

In some examples, the palette-based coding techniques may be configured for use with one or more video coding standards. For example, High Efficiency Video Coding (HEVC) is a new video coding standard being developed by the Joint Collaboration Team on Video Coding (JCT-VC) of ITU-T Video Coding Experts Group (VCEG) and ISO/IEC Motion Picture Experts Group (MPEG). A recent HEVC text specification draft is described in Bross et al., "High Efficiency Video Coding (HEVC) Text Specification Draft 10 (for FDIS & Consent)," JCVC-L1003_v13, 12th Meeting of JCT-VC of ITU-T SG16 WP 3 and ISO/IEC JCT 1/SC 29/WG 11, 14-23 Jan. 2013 ("HEVC Draft 10").

With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

In palette-based coding a particular area of video data may be assumed to have a relatively small number of colors. A video coder (a video encoder or video decoder) may code a so-called "palette" as a table of colors for representing the video data of the particular area (e.g., a given block). Each pixel may be associated with an entry in the palette that represents the color of the pixel. For example, the video coder may code an index that relates the pixel value to the appropriate value in the palette.

In the example above, a video encoder may encode a block of video data by determining a palette for the block, locating an entry in the palette to represent the value of each pixel, and encoding the palette with index values for the pixels relating the pixel value to the palette. A video decoder may obtain, from an encoded bitstream, a palette for a block, as well as index values for the pixels of the block. The video decoder may relate the index values of the pixels to entries of the palette to reconstruct the pixel values of the block. Pixels (and/or related index values that indicate a pixel value) may generally be referred to as samples.

It is assumed that samples in the block are processed (e.g., scanned) using horizontal raster scanning order. For example, the video encoder may convert a two-dimensional block of indices into a one-dimensional array by scanning the indices using a horizontal raster scanning order. Likewise, the video decoder may reconstruct a block of indices using the horizontal raster scanning order. Accordingly, this disclosure may refer to a previous sample as a sample that precedes the sample currently being coded in the block in the scanning order. It should be appreciated that scans other than a horizontal raster san, such as vertical raster scanning order, may also be applicable. The example above is intended provide a general description of palette-based coding.

A palette typically includes entries numbered by an index and representing at least one color component (for example, at least on one component of RGB, YUV, or the like) values or intensities. Both a video encoder and a video decoder determine the number of palette entries, color component values for each palette entry and the exact ordering of the palette entries for the current block. In this disclosure, it is assumed that each palette entry specifies the values for all color components of a sample. However, the concepts of this disclosure are applicable to using a separate palette for each color component.

In some examples, a palette may be composed using information from previously coded blocks or previously coded palettes. That is, a palette may contain predicted palette entries predicted from the palette(s) used to code the previous block(s). For example, as described in standard submission document Wei Pu et al., "AHG10: Suggested Software for Palette Coding based on RExt6.0," JCTVC-Q0094, Valencia, ES, 27 Mar.-4 Apr. 2014 (hereinafter JCTVC-Q0094), a palette may include entries that are copied from a predictor palette. A predictor palette may include palette entries from blocks previously coded using palette mode or other reconstructed samples. The predictor palette may use all or part of a previously-coded palette, or may be composed from entries of several previously-coded palettes.

In some examples, for each entry in the predictor palette, a binary flag may be coded to indicate whether the entry associated with the flag is copied to the current palette (e.g., indicated by flag=1). The string of binary flags may be referred to as the binary palette prediction vector. The palette for coding a current block may also include a number of new palette entries, which may be explicitly coded (e.g., separately from the palette prediction vector). An indication of the number of new entries may also be coded. A sum of the predicted entries and new entries may indicate the total palette size in for block.

As proposed JCTVC-Q0094, each sample in a block coded with a palette-based coding mode may be coded using one of the three palette modes, as set forth below:

Escape mode: in this mode, the sample value is not included into a palette as a palette entry and the quantized sample value is signaled explicitly for all color components. It is similar to the signaling of the new palette entries, although for new palette entries, the color component values are not quantized.

Copy mode (also referred to as CopyFromTop mode or CopyAbove mode): in this mode, the palette entry index for the current sample is copied from the sample located directly above in a block.

Run mode (also referred to as Index mode, Value mode, or copy from left mode): in this mode, the value of the palette entry index is explicitly signaled. A run of the number of the number of following consecutive indices having the same value may also be signaled.

As described herein, a palette entry index may be referred as a palette index or simply index. These terms can be used interchangeably to describe techniques of this disclosure. In addition, as described in greater detail below, a palette index may have one or more associated color or intensity values. For example, a palette index may have a single associated color or intensity value associated with a single color or intensity component of a pixel (e.g., a Red component of RGB data, a Y component of YUV data, or the like). In another example, a palette index may have multiple associated color or intensity values. In some instances, palette-based coding may be applied to code monochrome video. Accordingly, "color value" may generally refer to any color or non-color component used to generate a pixel value.

For Copy and Run modes, a run value (which may also be referred to simply as run) may also be signaled. A run value may indicate a number of consecutive samples (e.g., a run of samples) in a particular scan order in a palette-coded block that are coded together. In some instances, the run of samples may also be referred to as a run of palette indices, because each sample of the run has an associated index to a palette.

A run value may indicate a run of palette indices that are coded using the same palette-coding mode. For example, with respect to Run mode, a video coder (a video encoder or video decoder) may code a palette index (also referred to as a palette index value or simply index value) and a run value that indicates a number of consecutive samples in a scan order that have the same palette index and that are being coded with the palette index. With respect to Copy mode, the video coder may code an indication that an index for the current sample value is copied based on an index of an above-neighboring sample (e.g., a sample that is positioned above the sample currently being coded in a block) and a run value that indicates a number of consecutive samples in a scan order that also copy a palette index from an above-neighboring sample and that are being coded with the palette index. Accordingly, in the examples above, a run of palette indices refers to a run of palette indices having the same value or a run of palette indices that are copied from above-neighboring palette indices.

Hence, the run may specify, for a given mode, the number of subsequent samples that belong to the same mode. In some instances, signaling an index and a run value may be similar to run length coding. In an example for purposes of illustration, a string of consecutive indices of a block may be 0, 2, 2, 2, 2, 5 (e.g., where each index corresponds to a sample in the block). In this example, a video coder may code the second sample (e.g., the first index value of two) using Run mode. After coding an index that is equal to 2, the video coder may code a run of three, which indicates that the three subsequent samples also have the same index value of two. In a similar manner, coding a run of four after coding an index using Copy mode may indicate that a total of five indices are copied from the corresponding indices in the row above the sample position currently being coded.

As described in greater detail below, a video coder (e.g., a video encoder and a video decoder) may encode or decode data that indicates whether a sample is coded as an escape sample on a per-sample basis. Escape samples (also referred to as escape pixels) may be samples (or pixels) of a block that do not have a corresponding color represented in a palette for coding the block. Accordingly, escape samples may not be reconstructed using a color entry (or pixel value) from a palette. Instead, the color values for escape samples are signaled in a bitstream separately from the color values of the palette. In general, coding a sample using "Escape mode" may generally refer coding a sample of a block that does not have a corresponding color represented in a palette for coding the block. As noted above, such samples may be referred to as escape samples or escape pixels.

In some examples, the video coder may code a flag for each sample that indicates whether the sample is coded as an escape sample (this technique may be referred to as explicit escape signaling), followed by the escape sample value. In another example, the video coder may code an additional index value for a palette to indicate that a particular sample is coded as an escape sample (this technique may be referred to as implicit escape signaling).

This disclosure describes various techniques related to palette-based video coding. In some aspects, this disclosure includes techniques for a new mode of palette-based coding, namely, a "copy from previous rows" mode. For instance, this disclosure may support adding a copy from previous rows mode to existing modes of palette-based video coding (e.g., such as the Run mode, Copy mode or Escape mode describe above). The copy from previous rows mode described herein may provide a video coding device (such as a video encoder or video decoder) with enhanced palette-based coding capabilities in comparison to existing palette-based coding modes.

For example, the above-noted copy from previous rows mode may allow a video coder (e.g., a video encoder or video decoder) to copy one or more indices from a line of indices that is not directly adjacent to a line of indices currently being coded in a block. In an example, a video coding device may determine a palette for decoding a block of video data, where the palette includes one or more palette entries each having a respective palette index, determine a reference run of palette indices for first pixels of the block of video data, and determine a current run of palette indices for second pixels of the block of video data based on the reference run. More specifically, to determine the current run, the video coding device may locate a reference index included in the reference run, such that the reference index is spaced at least one line from an initial index of the current run. Additionally, the video coding device may determine a run length of the reference run, where a final index of the reference run is separated in the block from the initial index of the current run by at least one index. The video coding device may copy the indices included in the reference run as the current run of palette indices, and code the pixels of the block mapped to the copied current run of palette indices using the palette.

Hence, in some examples, the copy from previous rows mode may provide for additional flexibility when coding indices, which may improve coding efficiency. In some examples, the techniques described herein may constrain a range (or "dynamic range") of potential reference pixels so as to reduce or potentially eliminate redundancy over potential reference pixels provided by the copy mode. For example, the techniques may identify situations in which a particular row of previously-coded pixels belongs to a different run from all possible reference pixel runs for the current pixel. In this example, the techniques may enable a coding device to preemptively eliminate the particular row from a search range for the reference index, thereby conserving computing resources such as processor clock cycles and memory accesses. Thus, techniques of this disclosure may improve on existing palette-based coding technologies while enabling video coding devices to utilize computing resources in an efficient manner.

Other aspects of this disclosure include techniques for coding information that identifies a particular palette-coding mode used for a pixel. For instance, the techniques enable a video coding device to use a unique truncated unary codeword to identify each of various palette-coding modes, including the copy from previous rows mode described herein. According to various implementations of the techniques disclosed herein, a video coding device may derive a context corresponding to one or more bins of a truncated unary codeword that is coded to identify a particular palette-based coding mode used for a pixel of a palette-coded block.

In some examples, the techniques may enable the video coding device to use the size of the palette for a palette-coded block to determine how many different truncated unary codewords are to be coded for the block. In scenarios in which the palette size is within a predetermined threshold size, the video coding device may implement the techniques to limit the number of truncated unary codewords to be within a range that can be expressed with a single bit. In this manner, the techniques may enable the video coding device to conserve computing resources and reduce bitrate requirements based on the size of the palette for a palette-coded block.

Some aspects of this disclosure are directed to increasing efficiency for run length coding of palette indices. For instance, according to existing palette-based coding techniques, the run length may be explicitly coded and signaled in the encoded video bitstream. However, explicit signaling of the run length may cause potential inefficiencies. For example, relatively long run lengths may require a relatively large number of bits to explicitly signal. To mitigate the bitrate requirements associated with run length coding, the techniques of this disclosure may include imposing a run length constraint when coding run lengths. The run length constraint may be applied in conjunction with a particular palette mode. For example, the techniques may include enabling a particular palette mode (e.g., the copy from previous rows mode described herein) for palette-based video coding based on whether or not a matching run length between a reference run and a current run meets a run length threshold.

In an example for purposes of illustration, a video coding device may enable the copy from previous rows mode, based on determining that a run length for the mode is equal to or larger than a threshold. In this example, a video encoder may encode and transmit the difference between the actual matching run length and the threshold. As described in further detail below, if the minimum run threshold is denoted by the variable 'T,' a video encoder may transmit the difference value denoted by 'K' in the bitstream to one or more video decoders. In this example, K=(N−T), where N is the actual matching run length. Correspondingly, a video decoder that receives the value of K may derive the actual matching run length N, by solving the following equation: N=K+T. Accordingly, in the examples above, a fewer number of bits may be used to indicate a run length (e.g., relative to coding without the threshold). Hence, the techniques of this disclosure may, in some examples, improve efficiency when coding run lengths with certain palette coding modes, as described in greater detail below.

Published U.S. Patent Application Publication Number 2014/0301475 and its counterpart International Patent Application Number PCT/US2014/33019 describe palette-based video coding techniques. In some examples, the techniques of this disclosure may be used as an extension of one or more techniques described in such documents.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Draft 10.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium. Thus, while video decoder 30 may be referred to as "receiving" certain information, the receiving of information does not necessarily occur in real- or near-real-time and may be retrieved from a medium at some time after storage.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

In some examples, video encoder 20 and video decoder 30 operate according to a video compression standard, such as HEVC standard mentioned above, and described in HEVC Draft 10. In addition to the base HEVC standard, there are ongoing efforts to produce scalable video coding, multiview video coding, and 3D coding extensions for HEVC. In addition, palette-based coding modes, e.g., as described in this disclosure, may be provided for extension of the HEVC standard. In some examples, the techniques described in this disclosure for palette-based coding may be applied to encoders and decoders configured to operation according to other video coding standards, such as the ITU-T-H.264/AVC standard or future standards. Accordingly, application of a palette-based coding mode for coding of coding units (CUs) or prediction units (PUs) in an HEVC codec is described for purposes of example.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan. A coded slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units or blocks may include CTUs, CUs, PUs, transform units (TUs), macroblocks, macroblock partitions, and so on. In some contexts, discussion of PUs may be interchanged with discussion of macroblocks or macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive blocks (e.g., predictive luma, Cb and Cr blocks) for one or more PUs of a CU, video encoder 20 may generate residual blocks for the CU. Each sample in a residual block of the CU may indicate a difference between a sample in a predictive block of a PU of the CU and a corresponding sample in a coding block of the CU. For example, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., luma, Cb and Cr residual blocks) of a CU into one or more transform blocks (e.g., luma, Cb and Cr transform blocks). A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a transform block to generate a coefficient block for a TU. A coefficient block may be a two-dimensional array of transform coefficients. A transform coefficient may be a scalar quantity. For example, video encoder 20 may apply one or more transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream. The bitstream may also include syntax elements that are not entropy encoded.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for supplemental enhancement information (SEI), and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may obtain syntax elements from the bitstream. For example, video decoder 30 may parse the bitstream to decode syntax elements from the bitstream. Video decoder 30 may reconstruct the pictures of the video data based at least in part on the syntax elements obtained (e.g., decoded) from the bitstream. The process to reconstruct the video data may be generally reciprocal to the process performed by video encoder 20.

For instance, video decoder 30 may use MVs of PUs to determine predictive sample blocks (i.e., predictive blocks) for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors or pixel values representing the video data of a particular area (e.g., a given block). In this way, rather than coding actual pixel values or their residuals for a current block of video data, the video coder may code index values for one or more of the pixels values of the current block, where the index values indicate entries in the palette that are used to represent the pixel values of the current block.

For example, video encoder 20 may encode a block of video data by determining a palette for the block, locating an entry in the palette having a value representative of the value of one or more individual pixels of the block, and encoding the block with index values that indicate the entry in the palette used to represent the one or more individual pixel values of the block. Additionally, video encoder 20 may signal the index values in an encoded bitstream. In turn, a video decoding device (e.g., video decoder 30) may obtain, from the encoded bitstream, the palette for a block, as well as index values used for determining the various individual pixels of the block using the palette. Video decoder 30 may match the index values of the individual pixels to entries of the palette to reconstruct the pixel values of the block. In instances where the index value associated with an individual pixel does not match any index value of the corresponding palette for the block, video decoder 30 may identify such a pixel as an escape pixel, for the purposes of palette-based coding.

In another example, video encoder 20 may encode a block of video data according to the following operations. Video encoder 20 may determine prediction residual values for individual pixels of the block, determine a palette for the block, and locate an entry (e.g., index value) in the palette having a value representative of the value of one or more of the prediction residual values of the individual pixels. Additionally, video encoder 20 may encode the block with index values that indicate the entry in the palette used to represent the corresponding prediction residual value for each individual pixel of the block. Video decoder 30 may obtain, from an encoded bitstream signaled by source device 12, a palette for a block, as well as index values for the prediction residual values corresponding to the individual pixels of the block. As described, the index values may correspond to entries in the palette associated with the current block. In turn, video decoder 30 may relate the index values of the prediction residual values to entries of the palette to reconstruct the prediction residual values of the block. The prediction residual values may be added to the prediction values (for example, obtained using intra or inter prediction) to reconstruct the pixel values of the block.

Video encoder 20 may derive a palette that includes the most dominant pixel values in the current block. For instance, the palette may refer to a number of pixel values which are determined or assumed to be dominant and/or representative for the current CU. Video encoder 20 may first transmit the size and the elements of the palette to video decoder 30. Additionally, video encoder 20 may encode the pixel values in the given block according to a certain scanning order. For each pixel included in the given block, video encoder 20 may signal the index value that maps the pixel value to a corresponding entry in the palette. If the pixel value is not included in the palette (i.e., no palette entry exists that specifies a particular pixel value of the palette-coded block), then such a pixel is defined as an "escape pixel." In accordance with palette-based coding, video encoder 20 may encode and signal an index value that is reserved for an escape pixel. In some examples, video encoder 20 may also encode and signal the pixel value or a residual value (or quantized versions thereof) for an escape pixel included in the given block.

Upon receiving the encoded video bitstream signaled by video encoder 20, video decoder 30 may first determine the palette based on the information received from video encoder 20. Video decoder 30 may then map the received index values associated with the pixel locations in the given block to entries of the palette to reconstruct the pixel values of the given block. In some instances, video decoder 30 may determine that a pixel of a palette-coded block is an escape pixel, such as by determining that the pixel is palette-coded with an index value reserved for escape pixels. In instances where video decoder 30 identifies an escape pixel in a palette-coded block, video decoder 30 may receive the pixel value or a residual value (or quantized versions thereof) for an escape pixel included in the given block. Video decoder 30 may reconstruct the palette-coded block by mapping the individual pixel values to the corresponding palette entries, and by using the pixel value or residual value (or quantized versions thereof) to reconstruct any escape pixels included in the palette-coded block.

In some examples, video encoder 20 may encode one or more syntax elements indicating a number of consecutive pixels in a given scan order that are coded together. For example, as noted above, a run value may indicate a number of consecutive samples (e.g., a run of samples), or a number of consecutive indices (e.g., a run of indices), or any combination of samples and indices, in a particular scan order in a palette-coded block that are coded together. In some instances, a run value may indicate a run of palette indices that are coded using the same palette-coding mode.

In some examples, a pixel value may be associated with exactly one index value in a palette. Accordingly, in some instances, a run of values may also refer to a string of like-valued pixel values. In other examples, as described with respect to lossy coding below, more than one pixel value may map to the same index value in a palette. In such examples, a run of values refers to like-valued index values.

In an example for purposes of illustration, if two consecutive indices in a given scan order have different values, the run is equal to zero. If two consecutive indices in a given scan order have the same value but the third index in the scan order has a different value, the run is equal to one. Video decoder 30 may obtain the syntax elements indicating a run from an encoded bitstream and use the data to determine the number of consecutive pixel locations that have the same index value.

Additionally or alternatively, according to aspects of this disclosure, video encoder 20 and video decoder 30 may perform line copying for one or more entries of a map. The entries may also be referred to as "positions" due to the relationship between entries of the map and pixel positions of a block. The line copying may depend, in some examples, on the scan direction. As described herein, a "line" may generally refer to a row of a block or a column of a block, depending on a scan order for the block.

For example, video encoder 20 may indicate that a pixel value or index map value for a particular position in a block is equal to the pixel or index value in a line above the particular position (for a horizontal scan) or the column to the left of the particular position (for a vertical scan). Video encoder 20 may also indicate, as a run, the number of pixel values or indices in the scan order that are equal to the corresponding pixel values or indices above or the column to the left of the particular position. In this example, video encoder 20 and/or video decoder 30 may copy pixel or index values from the specified neighboring line and from the specified number of entries for the line of the block currently being coded.

In some instances, according to aspects of this disclosure, the line from which values are copied may be directly adjacent to, e.g., above or to the left of, the line of the position currently being coded. In other examples, according to aspects of this disclosure, a number of lines of the block may be buffered by video encoder 20 and/or video decoder 30, such that any of the number of lines of the map may be used as predictive values for a line of the map currently being coded. In an example for purposes of illustration, video encoder 20 and/or video decoder 30 may be configured to store the previous four rows of indices or pixel values prior to coding the current row of pixels. In this example, the predictive row (the row from which indices or pixel values are copied) may be indicated in a bitstream with a truncated unary code or other codes such as unary codes. With respect to a truncated unary code, video encoder 20 and/or video decoder 30 may determine a maximum value for the truncated unary code based on a maximum row calculation (e.g., row_index-1) or a maximum column calculation (e.g., column_index-1). In addition, an indication of the number of positions from the predictive row that are copied may also be included in the bitstream. In some instances, if the line or column from which a current position is being predicted belongs to another block (e.g., CU or CTU), then such prediction may be disabled.

Techniques of this disclosure are directed to providing a palette-based video coding mode, namely, the copy from previous rows mode introduced above. More specifically, the techniques described herein enable video encoder 20 and video decoder 30 to support the copy from previous rows mode in conjunction with supporting the run, copy, and escape modes of palette-based video coding. With reference to the existing group of palette-based coding modes, the techniques of this disclosure may provide an "extended" set of palette-based coding modes, which includes the copy from previous rows mode. Certain aspects of this disclosure are directed to coding and derivation techniques for the copy from previous rows mode of palette-based coding, and other aspects are directed to signaling of mode-identifying information that supports information to identify the copy from previous rows mode.

The copy from previous rows mode of this disclosure differs from the existing copy mode in that video encoding device 20 and/or video decoding device 30 may implement the copy from previous rows mode to leverage a reference pixel that is positioned multiple rows above the pixel being coded (the "current" pixel). Additionally, video encoder 20 and/or video decoder 30 may determine a matching length to be any number smaller than a total number of pixels in the block that is currently being coded.

To encode a pixel of a palette-coded block according to the copy from previous rows mode, video encoder 20 may copy the palette index from a reference pixel that is positioned multiple rows above the current pixel. In some examples of encoding according to the copy from previous rows mode, video encoder 20 may identify the reference pixel as being in the same column as the current pixel, and positioned multiple rows above the current pixel. In other words, to encode a pixel using the copy from previous rows mode, video encoder 20 may copy the index of a reference pixel that is in the same column as the current pixel, and positioned two or more rows above the current pixel.

Additionally, in accordance with the copy from previous rows mode for palette-based coding, video encoder 20 may encode a row index, and include the row index in a bitstream (e.g., an encoded video bitstream signaled via channel 16). Thus, video encoder 20 may indicate to video decoder 30 which previous row includes the reference pixel for a current pixel encoded according to the copy from previous rows mode. In some examples, video encoder 20 may encode an indication of a run length, beginning at the reference pixel, and signal the run length to video decoder 30. In this manner, video encoder 20 may enable video decoder 30 to copy reference palette indices for an entire run (starting at the reference pixel) to a corresponding run (beginning at the current pixel). Aspects of this example are discussed in further detail below, with respect the "matching length" between the run of the reference pixel run and the run of the current pixel.

In turn, video decoder 30 may reconstruct a pixel encoded according to the copy from previous rows mode using the row index signaled by video encoder 20. For instance, video decoder 30 may use the row index signaled by video encoder 20 to identify the row (e.g., which is positioned two or more rows above the row of the pixel being reconstructed) that includes the reference pixel. Additionally, video decoder 30 may determine that the left-to-right count (or column number) of the current pixel matches the column number of the reference pixel. Video decoder 30 may locate the intersection of the row index and the column number to identify the reference pixel. In turn, video decoder 30 may copy the palette index of the identified reference pixel to determine the color information of the current pixel being reconstructed. In this manner, video encoder 20 and video decoder 30 may implement the copy from previous rows mode of this disclosure to leverage a larger pool of potential reference pixels from which to copy a palette index for a current pixel, relative to simply copying an adjacent index value from an adjacent line in a block.

According to some implementations, video encoder 20 may constrain the number of possible rows from which to identify a reference pixel, according to the copy from previous rows mode of this disclosure. The number of possible rows from which to identify a reference pixel is referred to as a "range" or "dynamic range" herein. Video encoder 20 may search the dynamic range of previous rows to identify a reference pixel for the current pixel. For example, video encoder 20 may determine that the current pixel is positioned in a row denoted by the variable 'T.' In this scenario, the allowable row search range for the current pixel spans row 0 to row T-2, where T is greater than or equal to 2. The dynamic range of rows to be searched in this case is denoted by [0, T-2]. In the described example, row 0 denotes the first (or topmost) row of pixels in the current block, and row T-2 denotes the row that is positioned two rows above the row that includes the pixel being encoded currently.

As described above, video encoder 20 may encode a row index (denoted by 'i'), to identify the particular row of the palette-coded block that includes the reference pixel. Because the reference pixel for a pixel encoded according to the copy from previous rows mode is positioned in the dynamic range [0, T-2], i denotes an integer value that included in the range of [0, T-2]. Video encoder 20 may encode a symbol value corresponding to the row index as (T-2-i). For instance, video encoder 20 encoder 30 may encode the symbol value (T-2-i) using any of a truncated unary codeword, a fixed-length codeword, a Golomb-Rice codeword, or an exponential Golomb codeword. In one example of a Golomb-Rice codeword, video encoder 20 may use a Golomb-Rice parameter value of three. By limiting the dynamic range and/or coding an indication of the row index using a particular codeword, the techniques of this disclosure may improve video coding bit rate efficiency without materially effecting distortion.

Video decoder 30 may perform reciprocal operations to reconstruct the current pixel. For instance, video decoder 30 may receive the symbol value (T-2-i) in an encoded video bitstream, and use the symbol value to locate the reference pixel for the pixel to be reconstructed, as described above. In turn, video decoder 30 may use the palette index of the reference pixel to select a palette entry with which to reconstruct the current pixel. The maximum possible value for the symbol value (T-2-i) is related (e.g., directly proportional) to the value of T. In the example described above, the maximal value for the symbol value is T-2, for T greater than or equal to 2. For instance, provided that T has a value of two or more, then, if the row index 'i' has its minimum possible value of zero, then the symbol value calculation of (T-2-i) amounts to T-2.

In other examples, video encoder 20 may constrain the dynamic range (or "allowable search range") of rows to a subset of the broader range expressed by [0, T-2]. For instance, video encoder 20 may constrain the dynamic range within the row tuple [N1, N2], where each of N1 and N2 represents a respective row of pixels in a palette coded block, and where 0<=N1<=N2<=T-2. In other words, in this example, N2 is less than or equal to the value of (T-2), and N2 is greater than or equal to N1. N1, in turn, is greater than or equal to zero in this example. In this example, video encoder 20 constrains the dynamic range such that the allowable search rows, traversing from the current pixel upwards to the zeroth row, goes from row N2 to row (N1+1). In one example, the allowable row range spans the row tuple [N1, N2], where N1 is equal to zero, N2 is greater than zero, and (T-2) is greater than N2 (expressed as N1=0 and N1<N2<T-2).

In various examples according to aspects of this disclosure, video encoder 20 may signal the dynamic range of allowable search rows to video decoder 30. In the examples of the row tuple [N1, N2] described above, video encoder 20 may signal the dynamic range spanning from row N2 to row (N1+1) in different levels of video data. As some non-limiting examples, video encoder 20 may signal the dynamic range information in one or more of a sequence parameter set (SPS), a picture parameter set (PPS), a slice parameter set, or in a coding unit (CU). The row index i, for i representing an integer value within the dynamic range of [N1, N2], has a corresponding symbol value (N2-i). Video encoder 20 may transmit the symbol value (N2-1) using any of a fixed length codeword, a truncated unary codeword, a truncated binary codeword, a Golomb-Rice codeword, or an exponential Golomb codeword.

Table 1 below illustrates examples of truncated unary codewords that video encoder 20 may use to encode the row index within the dynamic range of [N1, N2] in the scenario where N1=0 and N2=6. In some examples, if the reference row is relatively closer to the current row (e.g., the row that includes the pixel being encoded), video encoder 20 may use a relatively shorter codeword to encode the reference row index.

TABLE 1

Truncated unary code to code the row index

| I | N2-i | codeword |
|---|------|----------|
| 6 | 0 | 0 |
| 5 | 1 | 10 |
| 4 | 2 | 110 |
| 3 | 3 | 1110 |

TABLE 1-continued

Truncated unary code to code the row index

| I | N2-i | codeword |
|---|---|---|
| 2 | 4 | 11110 |
| 1 | 5 | 111110 |
| 0 | 6 | 111111 |

Alternatively, video encoder 20 may use truncated binary code to signal information indicative of the value of the row index i. Truncated binary coding is often used for uniform probability distributions with a finite alphabet, and is parameterized by an alphabet with total size of number denoted by "n." Truncated binary coding may be described as a generalized form of binary encoding in cases where the value of n is not a power of two. If n is indeed a power of two, then the coded value for $0 \leq x < n$ is the simple binary code for x of length $\log_2(n)$. Otherwise, $k = \text{floor}(\log_2(n))$, such that $2k \leq n < (2k+1)$ and $u = 2k+(1-n)$, where u represents a value lesser than the value of n.

According to truncated binary coding, a coding device, such as video encoder 20 or video decoder 30, assigns the first u symbols codewords of length k, and then assigns the remaining (n-u) symbols the last (n-u) codewords of length (k+1). Table 2 below illustrates truncated binary codewords that video encoder 20 may use, i an example where n=5.

TABLE 2

Truncated binary codewords

| Symbol | Bin string | | |
|---|---|---|---|
| 0 | 0 | 0 | |
| 1 | 0 | 1 | |
| 2 | 1 | 0 | |
| 3 | 1 | 1 | 0 |
| 4 | 1 | 1 | 1 |
| binIdx | 0 | 1 | 2 |

In accordance with aspects of this disclosure, video encoder 20 and/or video decoder 30 may detect and mitigate (or potentially eliminate) redundancy of row index information. For instance, in encoding a reference row index, video encoder 20 may detect any redundant reference row index information in comparison to a previous pixel that is encoded using the copy from previous rows mode. In one example, video encoder 20 may identify the previous pixel as a pixel that immediately precedes the current pixel in horizontal raster scan order. If video encoder 20 determines that the identified previous pixel was encoded according to the copy from previous rows mode of this disclosure, video encoder 20 may determine whether the reference row index information for the current pixel is redundant over the reference row index information for the previous pixel.

An example is described below, in which the previous pixel was encoded using the copy from previous row mode, and has a coded symbol of (N2, prev-iprev) for the corresponding reference row index. In this example, video encoder 20 may determine that the current pixel, if encoded according to the copy from previous rows mode, cannot have the same coded symbol for its reference row index. In other words, video encoder 20 may determine that the reference row index coded symbol (N2, cur-icur) for the current pixel is different from the reference row index (N2, prev-iprev) for the previous pixel, provided that the current pixel is also encoded according to the copy from previous rows mode.

The variables 'iprev' and 'icur' represent actual reference row index values in the current block, in the example described above. Thus, video encoder 20 may exclude one possible row index during reference row index coding for the current block, if both the current and previous pixel are encoded using the copy from previous rows mode. More specifically, in encoding the reference row index for the current pixel, video encoder 20 may exclude the reference row index assigned to the previous pixel, namely, the reference row index described by the symbol value (N2, prev-iprev). Specific implementations of the techniques by which video encoder 20 may encode the reference row index for the current pixel according to the copy from previous rows mode are described below.

According to some implementations of the redundancy reduction techniques described herein, video encoder 20 may perform the following procedure to code the reference row index for a current pixel, if both the current pixel and the previous (immediately preceding in horizontal raster scan order) pixel are encoded with the copy from previous rows mode.

Video encoder 20 may encode RefCodedRowIdx=(N2, prev-iprev) to denote the coded reference row symbol for the previous pixel, and may encode TotalRowNum=(N2, cur-N1, cur+1) to denote the number of available reference rows for the current pixel. Additionally, video encoder 20 may derive the coded row index symbol for the current pixel, denoted as CurCodedRowIdx, according to the code that follows:

```
CurCodedRowIdx = (N2, cur – icur); //Initialize the
    coded symbol
TotalRowNum --;
    if (CurCodedRowIdx > RefCodedRowIdx){
        CurCodedRowIdx -- ;}
EntropyCodingFunction(CurCodedRowIdx, TotalRowNum);
``` where EntropyCodingFunction(CurCodedRowIdx, TotalRowNum) is an entropy coding method utilizing truncated binary, or truncated unary, or fixed length, or Exponential-Golomb, for instance.

Video decoder 30 may also implement redundancy reduction techniques of this disclosure. For instance, if video decoder 30 determines that both a current pixel to be reconstructed as well as the previous (immediately preceding, in horizontal raster scan order, as an example) pixel are encoded according to the copy from previous rows mode, video decoder 30 may decode the reference row index of the current pixel according to the non-limiting example implementations described below.

Video decoder 30 may encode RefCodedRowIdx the already decoded reference row symbol for the previous pixel, and may encode TotalRowNum=(N2, cur-N1, cur+1) as the number of possible available reference rows for the current pixel. Additionally, video decoder 30 may derive the row index symbol for the current pixel, denoted as CurCodedRowIdx, is derived according to the following code:

```
TotalRowNum --;
EntropyDecodingFunction(CurCodedRowIdx, TotalRowNum);
    if (CurCodedRowIdx > =RefCodedRowIdx){
        CurCodedRowIdx ++ ;} Fill
``` where EntropyDecodingFunction(CurCodedRowIdx, TotalRowNum) is an entropy decoding method utilizing truncated binary, or truncated unary, or fixed length, or Exponential Golomb to decode symbols. The reference row index is obtained using the values icur=N2, cur-CurCodedRowIdx.

Video encoder 20 may encode a matching length for a palette-coded block encoded using the copy from previous rows mode. In some examples, video encoder 20 may signal the matching length in a bitstream, enabling video decoder 30 to obtain the matching length for the palette-coded block. As used herein, the matching length of a palette-coded block refers to the number of consecutive reference pixels (in a previously-coded region) that match consecutive pixels yet to be coded, in terms of pixel difference. In one example, the previously-coded region may include the following series of values for reference pixels: [23, 25, 68, 233]. In this example, the region of pixels yet to be encoded includes the following series of values for "current" pixels: [11, 23, 25, 68, 233, 15].

As shown, four consecutive pixels of the current pixel series match (in value and order) the series of previously-coded reference pixels. Thus, video encoder 20 may determine the matching length of the current palette coded block is equal to four (4). In general, the matching length of a block may be any value smaller than the number of pixels in the current block, as different series of reference matching pixels may overlap with the current string.

Figure 5:
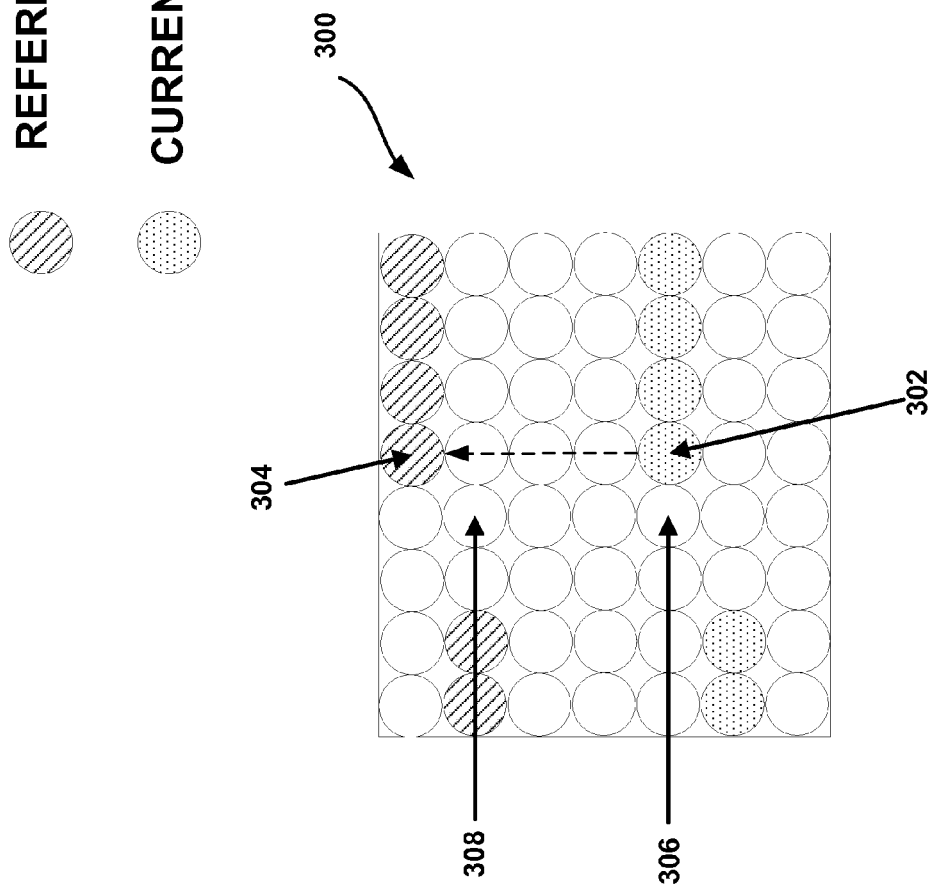
FIG. 5 is a conceptual diagram that illustrates an example palette-coded block, consistent with the techniques of this disclosure.

An example of "Copy from previous rows" is illustrated in FIG. 5, which is described in further detail below. In accordance with the copy from previous rows mode of this disclosure, video encoder 20 may determine the matching criteria using reference pixels that are positioned "straight above" or directly above the current pixel. In other words, video encoder 20 may identify a reference pixel such that the reference pixel has the same horizontal position in the current block as the current pixel. Thus, according to this example, while the reference pixel is positioned in a different (e.g., preceding by two or more) row than the current pixel, the reference pixel is necessarily positioned in the same column as the current pixel.

If a current string (or "run") of pixels is encoded using the copy from previous rows mode, then during the entropy encoding of the matching length information, video encoder 20 may use three additional contexts to encode the run, if the run is greater than zero (0), or greater than one (1), or greater than two (2). The three value scenarios listed above are denoted by the symbols (Gr0), (Gr1), and (Gr2) respectively, when the current string uses "Copy from previous row".

Video encoding device 20 may determine that the value of the matching length of a palette-coded block is constrained (or has a "constraint"). For instance, video encoder 20 may determine that the value of the matching length (denoted by the term "MatchingLen") has a certain minimum value (e.g., a value denoted by 'T'). In this case, the constraint on the matching length of the palette-coded block is expressed mathematically as MatchingLen>=T.

According to some implementations of the techniques described herein, video encoder 20 may encode and signal information indicative of the value of (MatchingLen-T), instead of the value of (MatchingLen-1) as in the case of existing palette-based coding techniques. Thus, according to these aspects of the techniques described herein, video encoder 20 may encode and signal the difference, or "delta" between the actual matching length of the block and the detected constraint on the value of the matching length. By encoding and signaling the value of (MatchingLen-T) in this manner, video encoder 20 may potentially conserve bitrate requirements and bandwidth consumption in providing the matching length information to video decoder 30.

A non-limiting example of the potential bitrate and bandwidth conservation is described herein. If the value of the constraint T is three (3), then video encoder 20 may encode and signal the value of (MatchingLen-3) to video decoder 30. In this example, depending on the raw value of the MatchingLen variable, the reduction by three (3) may potentially enable video encoder 20 to use less bits than encoding the value of (MatchingLen-1) as would be case with existing palette-based coding techniques.

In turn, video decoder 30 may decode the received (MatchingLen-T) value to obtain the matching length of the current palette-coded block. More specifically, video decoder 30 may implement existing techniques to decode the received value of (MatchingLen-T), and increment the received value by the constraint T. An example procedure that video decoder 30 may apply to obtain the value of MatchingLen is described in the code below:

```
DecodeRun(MatchingLen); /* DecodeRun is an entropy decoding method to decode the syntax MatchingLen */
MatchingLen +=T;
```

As described in greater detail below, FIG. 5 illustrates an example of a copy from previous row with Row 0 as the reference.

According to certain aspects of this disclosure, video encoder 20 and/or video decoder 30 may implement one or more techniques of this disclosure to increase efficiency for run length coding of palette indices. In some examples, video encoder 20 and/or video decoder 30 may implement certain techniques of this disclosure to impose a run length constraint when coding run lengths. Video encoder 20 and/or video decoder 30 may apply the run length constraint in conjunction with a particular palette mode. For example, video encoder 20 or video decoder 30 may enable a particular palette mode for palette-based video coding based on a run length threshold, where the run length threshold is associated with a number of pixels of a block being processed as a group with the palette mode. In an example for purposes of illustration, video encoder 20 and/or video decoder 30 may enable the copy from previous rows mode of this disclosure if the run length meets (e.g., is greater than or equal to) a threshold.

In some examples, in encoding a block of video data according to the copy from previous rows mode for palette-based coding of this disclosure, video encoder 20 may impose a constraint on the run length (or "matching run length") of a reference run and a currently-coded run, such that the run length meets or exceeds a corresponding threshold value. Additionally, video encoder 20 may enable the copy from previous rows mode when the matching run length is equal to or larger than a threshold. According to various implementations, the threshold may be a predefined constant number or an adaptive number (e.g., that is derived on a case-by-case basis). For instance, video encoder 20 may derive an adaptive threshold value based on various combinations of factors, including one or more of a reference row offset, a palette size, or a palette index for the starting pixel of a current run.

As described in further detail below, in some scenarios according to this disclosure, video encoder 20 and video decoder 30 may both be configured to obtain the threshold independently, thereby eliminating the need for video encoder 20 to signal the threshold value to video decoder 30. As also discussed in further detail below, in some examples according to this disclosure, video encoder 20 may signal the threshold to video decoder 30, thereby enabling video decoder 30 to derive the matching run length using the threshold value as a parameter or operand. In examples where video encoder 20 signals the threshold value, video encoder 20 may signal the threshold value at various levels, such as in the header of a parameter set, such as in a sequence parameter set (SPS) header or in a picture parameter set (PPS) header. In some examples, video encoder 20 may signal the threshold value explicitly in the bitstream, such as at the LCU level or at the CU level.

Video encoder 20 may signal the difference between the actual run length and the threshold value in the encoded video bitstream. For instance, video encoder 20 may signal the difference (denoted herein by the symbol 'K'). More specifically, the difference may be expressed by the equation K=(N−T), where N denotes the actual matching run length and where T denotes the minimum run threshold.

Correspondingly, video decoder 30 may derive the actual run length N using the signaled difference denoted by K. Video decoder 30 may add the threshold value to the received value of K, to obtain the actual matching run length for the portions of the palette-coded block that are encoded according to the copy from previous rows mode. More specifically, video decoder 30 may obtain the actual matching run length N by performing the following mathematical operation: K+T, where the value of K was received in the encoded video bitstream. As described above, K represents the mathematical expression (N−T). Thus, by adding the value of T to K, video decoder 30 effectively performs the mathematical operation (N−T+T), which yields the value of N. As described above, N represents the actual number of elements in the run (i.e., the run length).

In this manner, video encoder 20 and video decoder 30 may be configured to reduce bitrate requirements, in accordance with aspects of this disclosure. For instance, by signaling the difference value (K in the expressions above), video encoder 20 may signal a smaller value than the matching run length (N in the expressions above), potentially consuming fewer bits in the encoded video bitstream. Especially in instances where the matching run length is a relatively large value, as may be the case in various instances of runs coded according to the copy from previous rows mode, video encoder 20 may mitigate bitrate requirements. Correspondingly, video decoder 30 may also require fewer signaled bits to derive the matching run length (N in the expressions above), by leveraging the minimum threshold value (T in the expressions above). Thus, video encoder 20 and video decoder 30 may use the threshold-based constraint described herein to conserve bitrate while maintaining coding precision.

As described above, in various scenarios according to aspects of this disclosure, the minimum run threshold T may be a constant number. In such scenarios, both video encoder 20 and video decoder 30 may be configured to comply with the minimum run constraint for palette-based coding according to the copy from previous rows mode. In turn, because both video encoder 20 and video decoder 30 are both configured to implement the copy from previous rows mode in compliance with the constant threshold, the threshold-based constraint may eliminate any need for video encoder 20 to signal the threshold value to video decoder 30. Specifically, if video decoder 30 determines that the palette-based coding mode for the current pixel is the copy from previous rows mode, video decoder 30 may determine the actual run length using the received difference value of K. In one example, video decoder 30 may determine the threshold value T to be three (e.g., T=3). Using the value of K received from video encoder 20, video decoder 30 may add the value of three to the received value of K, to obtain the matching run length N. In this specific example, video decoder 30 may obtain the value of N by performing the operation (N−3+3).

According to other scenarios in accordance with aspects of this disclosure, video encoder 20 and video decoder 30 may adaptively derive the minimum run threshold T using on two factors. In these scenarios, the two factors are the reference row offset (e.g., the number of rows between the row currently being coded and the reference row from which indices are copied), and the palette index for the starting pixel of the current run. For example, to encode the reference row offset, video encoder 20 may require a number of bits denoted by 'A' in the binarization of truncated binary code. Additionally, to encode the palette index of the starting pixel of a run, video encoder 20 may require a number of bits denoted by 'N' in the binarization of truncated binary code. In these examples, both video encoder 20 and video decoder 30 may derive the minimum run threshold T according to the following equation:

$$T = \left\lfloor \left(\frac{A}{B}\right) + 0.5 \right\rfloor$$

Because both video encoder 20 and video decoder 30 are configured to apply the same function (shown above) to derive T, video encoder 20 may not need to signal the value of T explicitly to video decoder 30 via the bitstream.

According to still other examples in accordance with aspects of this disclosure, video encoder 20 and video decoder 30 may obtain the minimum run threshold T from a look-up table, given the values of the reference row offset and the palette index for the starting pixel of the current run (or current "string"). In other examples, video encoder 20 and video decoder 30 may obtain the minimum run threshold T from a look-up table given the binarization bits for the reference row offset and the palette index of the starting pixel for the current run. As an example, the following look-up table RunConstraint[9][6] may be used to derive the threshold, where the first index in RunConstraint[ ][ ] represents the number of bits used to encode reference row offset, and where the second index represents the number of bits used to encode the palette index. An example derivation of the look-up table above may be expressed as follows:

```
UInt RunConstraint[9][6] =
{
{1, 1, 1, 1, 1, 2},
{1, 3, 3, 3, 3, 2},
{1, 3, 3, 3, 2, 2},
{1, 3, 3, 3, 2, 2},
{1, 3, 3, 3, 3, 2},
{1, 3, 3, 3, 3, 3},
{1, 4, 4, 4, 3, 3},
{1, 1, 1, 1, 1, 1},
{1, 1, 1, 1, 1, 1}
};
```

In examples of look-up table-based derivation, both video encoder 20 and video decoder 30 may derive the threshold value T independently. Thus, the look-up table-based threshold derivation techniques of this disclosure may eliminate the need for video encoder 20 to signal the threshold value to video decoder 30.

In other examples in accordance with aspects of this disclosure, video encoder 20 may encode and explicitly signal the minimum threshold run length T for a palette-coded block encoded according to the copy from previous rows mode of this disclosure. In some such examples, video encoder 20 may encode and explicitly signal the value of T for a palette-coded block, irrespective of the palette-coding mode used for the block. In turn, video decoder 30 may receive the difference value K as well as the minimum run length threshold value T in the encoded video bitstream. Video decoder 30 may use the received values of K and T to derive the run length N for the current run (or current "string") by adding the received values of K and T. In various examples, video encoder 20 may encode the minimum run length threshold T for the palette-coded block using truncated unary code, Exponential-Golomb code, or using various coding techniques for run coding.

In examples where video encoder 20 signals the threshold value T, video encoder 20 may signal the threshold value at various levels, such as in the header of a parameter set, such as in a sequence parameter set (SPS) header or in a picture parameter set (PPS) header. In some examples, video encoder 20 may signal the threshold value explicitly in the bitstream, such as at the LCU level or at the CU level. In cases where video encoder 20 signals the value of T to video decoder 30, the techniques of this disclosure potentially provide a reduction in bitrate requirements, in that the values of K and T may require fewer bits than would be required to signal the value of N. As described above, the value of N may, in various scenarios, be a relatively large number that requires a commensurately large number of bits to signal.

In some examples, video encoder 20 and video decoder 30 may treat the copy from previous rows mode as a separate run mode. In some examples, according to aspects of this disclosure, video encoder 20 and video decoder 30 may merge the copy from previous rows mode with the copy above mode. For example, when signaling the syntax element palette_mode flag, video encoder may use only one bin to differentiate between the following combinations: (copy above, copy previous) or (copy left, escape). For instance, video encoder 20 may use a palette_mode flag value of 1 to indicate the copy above mode or copy previous row mode, and may use a palette_mode flag value of 0 to indicate the copy left mode or escape mode. In these examples, if video encoder 20 sets the palette_mode flag to the value of 1, then video encoder 20 may signal a syntax element represented by "yOffset" to indicate the reference row from which the palette index for the current pixel is copied. Video encoder 20 may implement techniques of this disclosure to encode a special codeword of yOffset with respect to the copy above mode and the copy from previous rows mode. For example, video encoder 20 may obtain the variable-length code (VLC) for the yOffset codeword as follows:

0—Copy Above mode

1+truncated binary code of yOffset—Copy Previous Row mode

Aspects of this disclosure are also directed to encoding, signaling, and decoding of information that identifies a palette coding mode for a pixel, where the pool of possible palette-based coding modes includes the copy from previous rows mode described above. In various examples, video encoder 20 may encode mode-identifying information using truncated unary code and signal the truncated unary code for the applicable mode to video decoder 30. In turn, video decoder 30 may be configured to decode the mode-identifying truncated unary code, to determine the palette-based coding mode applicable to a corresponding pixel of the palette-coded block.

In some instances, video encoder 20 and/or video decoder 30 may use a maximum symbol value in determining the truncated unary codes for the possible modes. According to one implementation, video encoder 20 and/or video decoder 30 may code the modes, in all instances, with a maximum symbol value equal to two (2). In contrast to existing palette-based coding technologies, which may constrain the truncated unary code to a value expressed using a single bit, the mode-identifying techniques of this implementation enable video encoder 20 and video decoder 30 to identify a palette-based coding mode with a value that can be expressed using a single bit or a value that requires two bits to be expressed.

According to one such implementation, video encoder 20 and video decoder 30 may use a single truncated unary codeword to express the usage of run mode, including the coding of escape pixels using index coding. More specifically, in this example, a single truncated unary codeword may represent the usage of run mode for a pixel, as well as the usage of a "reserved" palette index for an escape pixel. For instance, video encoder 20 and video decoder 30 may use the symbol 0 (expressed by truncated unary codeword 0) to indicate the usage of run mode for a pixel or the usage of a reserved palette index for an escape pixel. In this example, video encoder 20 and video decoder 30 may use the symbol 1 (expressed by the truncated unary codeword 10) to indicate the usage of copy mode for a pixel in the palette-coded block. Further, according to this example, video encoder 20 and video decoder 30 may use the symbol (expressed by the truncated unary codeword 11) to indicate the usage of the copy from previous rows mode for a pixel in the palette coded block. Table 3 below illustrates a mapping of symbols to the corresponding truncated unary codewords according to the implementation described above.

TABLE 3

Codewords for Extended Palette Mode Coding

| Symbol | Mode | Truncated unary codeword |
|---|---|---|
| 0 | Run mode (including escape using index coding) | 0 |
| 1 | Copy mode | 10 |
| 2 | Copy from previous row | 11 |

According to some examples of palette-based coding techniques, video encoder 20 may set a flag to indicate that a pixel in a palette-coded block is an escape pixel. In some such examples, video encoder 20 may encode the color information for the escape pixel and signal the encoded color information to video decoder 30. In turn, video decoder 30 may decode an enabled flag in the bitstream to identify a pixel in a palette-coded block as an escape pixel. Additionally, video decoder 30 may use the signaled color information to reconstruct the escape pixel.

According to one such implementation, video encoder 20 and video decoder 30 may use a single truncated unary codeword to express the usage of run mode for a palette-coded pixel. For instance, video encoder 20 and video decoder 30 may use the symbol 0 (expressed by truncated unary codeword 0) to indicate the usage of run mode for a pixel or the usage of a reserved palette index for an escape pixel. In this example, video encoder 20 and video decoder 30 may use the symbol 1 (expressed by the truncated unary codeword 10) to indicate the usage of copy mode for a pixel in the palette-coded block. Further, according to this example, video encoder 20 and video decoder 30 may use the symbol (expressed by the truncated unary codeword 11) to indicate the usage of the copy from previous rows mode for a pixel in the palette coded block. Table 4 below illustrates a mapping of symbols to the corresponding truncated unary codewords according to the implementation described above.

TABLE 4

Codewords for Extended Palette mode Coding

| Symbol | Mode | Truncated unary codeword |
|---|---|---|
| 0 | Run mode | 0 |
| 1 | Copy mode | 10 |
| 2 | Copy from previous row | 11 |

In some example implementations of the techniques described herein, video encoder 20 and video decoder 30 may set the maximum symbol value differently in different scenarios. For example, video encoder 20 and video decoder 30 may leverage information indicating the position of a current pixel in a palette-coded block and information indicating the mode with which a neighboring pixel of the current pixel is coded, to reduce the number of possible modes available to code the current pixel. By reducing the number of possible modes, video encoder 20 and video decoder 30 may implement techniques of this disclosure to address, mitigate, or potentially eliminate redundancy issues arising from existing palette-based coding technologies.

To address certain redundancy issues associated with palette-based coding, video encoder 20 and/or video decoder 30 determine that the current pixel is positioned in the first row of the palette-coded block, or that the left neighboring pixel of the current pixel is coded using copy mode. In such examples, video encoder 20 and/or video decoder 30 may use a reduced set of mode-identifying symbol values, such that the maximum symbol value is one (1) instead of two (2). Video encoder 20 and/or video decoder 30 may determine that the copy from previous rows mode is available for use starting from the third row in the palette-coded block. Thus, if the current pixel is in the first or the second row of the palette-coded block, video encoder 20 and video decoder 30 may eliminate the copy from previous rows mode as a possible mode for the current pixel. Video encoder 20 and video decoder 30 may thereby reduce the pool of possible palette-based coding modes for the pixel to just the run mode and copy mode, i.e. a total of two possible modes. Thus, video encoder 20 and video decoder 30 may reduce the maximum symbol value by one (1) to a value of one (1).

In cases where the maximum symbol value to identify a palette-based coding mode is zero (0), video encoder 20 may infer the mode information, instead of explicitly transmitting a symbol value. Similarly, video decoder 30 may infer the mode information in instances where the maximum symbol value is zero (0). The following pseudo code represents an example of redundancy removal techniques that video encoder 20 may implement in generating mode-identifying symbols:

```
forbidden = 0xFF;
if( uiIdx < uiWidth || pSPoint[uiIdx - 1] == 1 )
{
  maxMode--;
  forbidden = 1;
}
if (uiIdx < 2 * uiWidth)
    maxMode--;
xReadUnaryMaxSymbol( uiSymbol, &m_SPointSCModel.get( 0, 0, uiCtx), 0, maxMode);
if( uiSymbol >= forbidden )
{
  uiSymbol++;
}
pSPoint[uiIdx] = uiSymbol;
```

According to some implementations of the techniques described herein, video encoder 20 and/or video decoder 30 may derive the context for encoding the truncated unary code such that the context is dependent on the neighboring previously coded pixel mode. Specifically, video encoder 20 and/or video decoder 30 may use a number of contexts to encode the mode-identifying symbol. Video encoder 20 and video decoder 30 may code the contexts depending on the palette coding mode used for the previously-coded left neighboring pixel, or depending on the palette coding mode used for the previously-coded above neighboring pixel. For each of the left neighboring pixel and the above neighboring pixel, the possible coding modes include the run, copy, and copy from previous rows modes.

In one example, video encoder 20 and/or video decoder 30 may use the context of either the left neighboring pixel or the above neighboring pixel to code a first bin of the truncated unary codeword for the current pixel. Alternatively, in another example, video encoder 20 and/or video decoder 30 may use the context of either the left neighboring pixel or the above neighboring pixel to code all of the bins of the truncated unary codeword for the current pixel. Alternatively still, in another example, video encoder 20 and/or video decoder 30 may use the context of one of the left neighboring pixel or the above neighboring pixel to code the first bin, and the context of the other one of the left neighboring pixel or the above neighboring pixel to code the remaining bin of the truncated unary codeword to indicate the mode for the current pixel.

According to some implementations of the techniques described herein, video encoder 20 and/or video decoder 30 may determine that some of the available contexts depend on mode information for the previously-coded neighboring pixels, and that others of the contexts do not depend on mode information for any of the previously-coded neighboring pixels. In specific examples, there are two possible contexts with which video encoder 20 and/or video decoder 30 may code the first bin depending on the previously-coded (e.g. above or left) neighboring pixel. More specifically, video encoder 20 and/or video decoder 30 may select the context from the two available contexts, based on the palette-based coding mode (e.g., one of the run, copy, or copy from previous rows modes) used for the respective neighboring pixel.

In some examples, video encoder 20 and/or video decoder 30 may determine the context of the first bin of the truncated unary codeword dynamically, based on the coding mode that was used for the previously-coded neighboring pixel. For instance, the previously-coded neighboring pixel was coded using run mode, video encoder 20 and/or video decoder 30 may code the first bin using a single CABAC context, referred to herein as "context A." On the other hand, if the previously-coded neighboring pixel was coded using either copy mode or the copy from previous rows mode of this disclosure, video encoder 20 and/or video decoder 30 may code the first bin using another CABAC context, referred to herein as "context B."

For coding the second bin (if applicable, with respect to the truncated unary codeword), video encoder 20 and/or video decoder 30 may use a context that does not depend on the palette-based coding mode used for either of the previously-coded neighboring pixels (namely, the above neighbor and the left neighbor). Thus, video encoder 20 and/or video decoder 30 may code the second bin of the truncated unary codeword independently of mode-identify information pertaining to either of the previously-coded neighboring pixels. For instance, the second bin may remain constant in view of changing mode information pertaining to either of the previously-coded neighboring pixels. The CABAC context that video encoder 20 and/or video decoder 30 may use to code the second bin of the truncated unary codeword is referred to herein as "context C." As described above, video encoder 20 and/or video decoder 30 may use context C to code the second bin of the truncated unary codeword, regardless of the palette-based coding mode used for neighboring pixels that were coded prior to the current pixel being coded.

According to some implementations, video encoder 20 and/or video decoder 30 may combine the context assignment scheme described above in instances where the symbol (e.g. truncated unary codeword) is modified to address mode information redundancies. For example, video encoder 20 and/or video decoder 30 may enable the copy from previous rows mode of palette-based coding only in cases where the size of the palette meets or exceeds a threshold value. Video encoder 20 and video decoder 30 may use the QC_COPY_PREV_ROW_PLT_SIZE symbol to denote the threshold palette size at which to activate the copy from previous rows mode. In some instances, QC_COPY_PREV_ROW_PLT_SIZE may correspond to a palette size of two (2).

Additionally, video encoder 20 and video decoder 30 may enable the copy from previous rows mode starting at the third row of pixels in the current palette-coded block, continuing to subsequent rows below the third row. More specifically, the copy from previous rows mode involves copying an index from a reference pixel positioned multiple (i.e., at least two) rows above the current pixel. Thus, video encoder 20 and video decoder 30 may eliminate the copy from previous rows mode as a possible palette-based coding mode with respect to pixels positioned in the two topmost rows of the block, due to the fact that no pixels can possibly be positioned multiple rows above the two topmost rows. Additionally, in some instances, video encoder 20 and video decoder 30 may disable copy mode for the current pixel if the left neighboring pixel was coded using copy mode.

In instances of implementing any of the constraints described above, video encoder 20 and video decoder 30 may, in several cases, determine that only one or two palette-based coding modes are possible for a pixel, instead of three possible modes. More specifically, according to each constraint described above, video encoder 20 and video decoder 30 may reduce the number of possible palette-based coding modes to two (2) for a given pixel. Video decoder 30 may implement techniques represented by the following pseudo code to decode the palette mode information when the mode redundancy is addressed using one or more of the constraints described above:

```
UInt uiSymbol = 0, uiCtx = pcCU->getCtxSPoint(uiAbsPartIdx, uiIdx, pSPoint);
    if (pltSize > QC_COPY_PREV_ROW_PLT_SIZE)
    {
      if (uiIdx >= 2 * uiWidth)
      {
        m_pcTDecBinIf->decodeBin(uiSymbol,
m_SPointSCModel.get(0, 0, uiCtx))
          //m_pcBinIf->encodeBin(mode == 0 ? 0 : 1,
m_SPointSCModel.get(0, 0, uiCtx)); //ZF
        if (uiSymbol == 0)
        {
          pSPoint[uiIdx] = 0;
        }
        else
        {
          if (pSPoint[uiIdx - 1] != 1)
          {
            m_pcTDecBinIf->decodeBin(uiSymbol,
m_SPointSCModel.get(0, 0, 2));
            pSPoint[uiIdx] = (uiSymbol == 1) ? 2 : 1;
          }
          else
          {
            pSPoint[uiIdx] = 2;
          }
        }
      }
      else if (uiIdx >= uiWidth)
      {
        if (pSPoint[uiIdx - 1] != 1)
        {
          m_pcTDecBinIf->decodeBin(uiSymbol,
m_SPointSCModel.get(0, 0, uiCtx));
          pSPoint[uiIdx] = uiSymbol;
        }
        else
        {
          pSPoint[uiIdx] = 0;
        }
      }
      else
      {//first row
        pSPoint[uiIdx] = 0;
      }
    }
    else
    {
      if (uiIdx >= uiWidth && pSPoint[uiIdx - 1] != 1)
      {
        m_pcTDecBinIf->decodeBin(uiSymbol,
m_SPointSCModel.get(0, 0, uiCtx));
      }
      pSPoint[uiIdx] = uiSymbol;
    }
```

Video encoder 20 may implement corresponding techniques to implement one or more of the described constraints, as well. By applying any one or more of the constraints described above, video encoder 20 and video decoder 30 may implement various techniques of this disclosure to reduce bitrate requirements and conserve computing resources, while maintaining picture precision. For instance, in cases where video encoder 20 and video decoder 30 constrain the number of possible palette-coding modes for a pixel to two (2), the number of bits required to signal the mode is reduced to a single bit. More specifically, video encoder 20 and video decoder 30 may implement the constraints to avail of single-bit scenarios to identify a mode, while still supporting three modes (including the copy from previous rows mode of this disclosure) of palette-coding.

Figure 2:
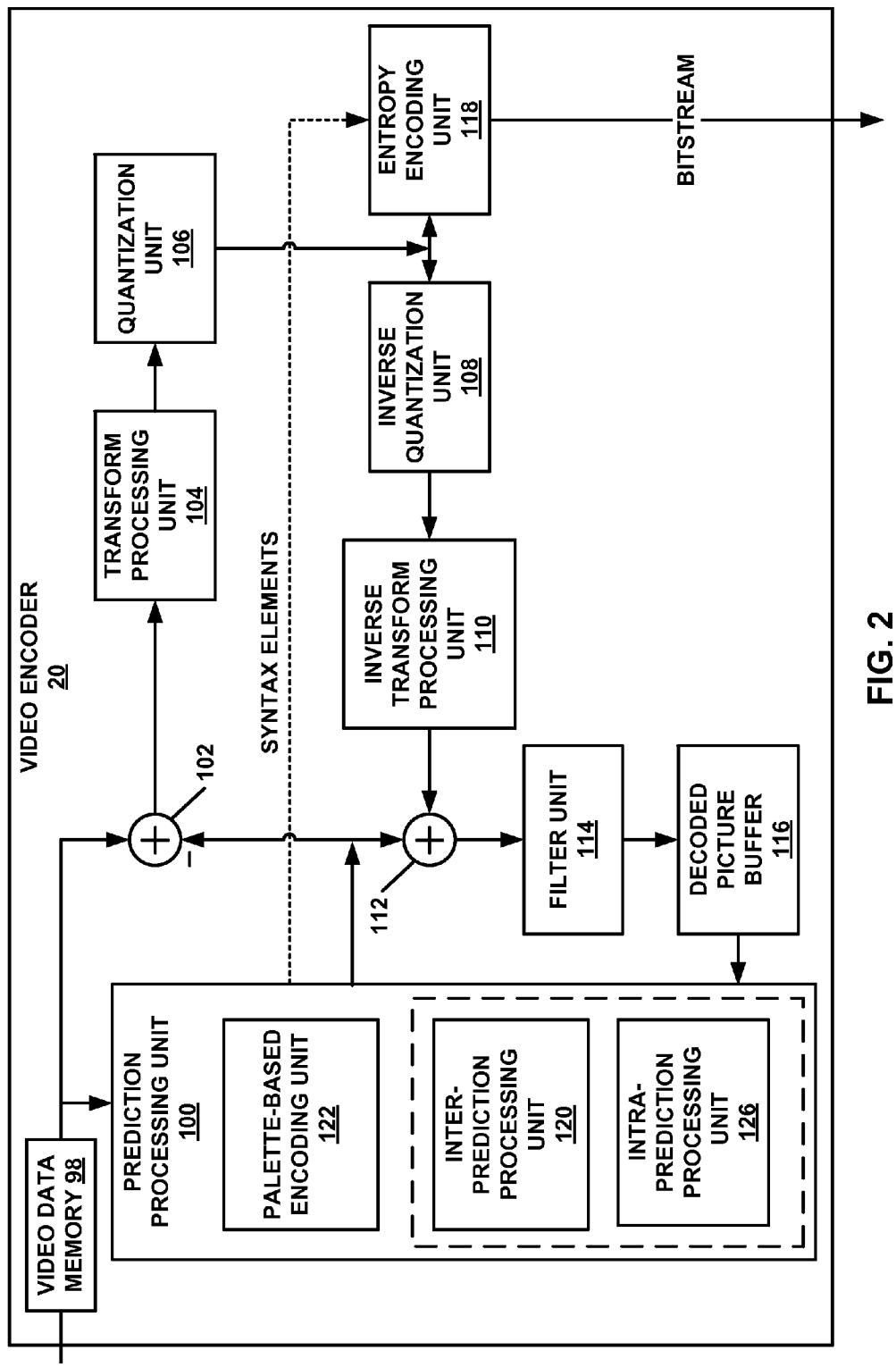
FIG. 2 is a block diagram illustrating an example of a video encoder that may utilize techniques described in this disclosure for palette-based video coding.

FIG. 2 is a block diagram illustrating an example video encoder 20 that may implement various techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a video data memory 98, a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video data memory 98 may store video data to be encoded by the components of video encoder 20. The video data stored in video data memory 98 may be obtained, for example, from video source 18. Decoded picture buffer 116 may be a reference picture memory that stores reference video data for use in encoding video data by video encoder 20, e.g., in intra- or inter-coding modes. Video data memory 98 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 98 and decoded picture buffer 116 may be provided by the same memory device or separate memory devices. In various examples, video data memory 98 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include one or more predictive sample blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predictive block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely correspond to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive sample blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. The motion compensation unit of inter-prediction processing unit 120 may generate the predictive sample blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive sample blocks of the PU based at least in part on actual or interpolated samples at the reference region indicated by the motion vector of the PU.

In accordance with various examples of this disclosure, video encoder 20 may be configured to perform palette-based coding. With respect to the HEVC framework, as an example, the palette-based coding techniques may be configured to be used as a CU mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to a PU mode. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based decoding when a palette-based encoding mode is selected, e.g., for a CU or PU. For example, palette-based encoding unit 122 may be configured to generate a palette having entries indicating pixel values, select pixel values in a palette to represent pixel values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

Palette-based encoding unit 122 may be configured to generate any of the various syntax elements described herein. Accordingly, video encoder 20 may be configured to encode blocks of video data using palette-based code modes as described in this disclosure. Video encoder 20 may selectively encode a block of video data using a palette coding mode, or encode a block of video data using a different mode, e.g., such an HEVC inter-predictive or intra-predictive coding mode. The block of video data may be, for example, a CU or PU generated according to an HEVC coding process. A video encoder 20 may encode some blocks with inter-predictive temporal prediction or intra-predictive spatial coding modes and decode other blocks with the palette-based coding mode.

Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. When using some intra prediction modes to generate a set of predictive data for the PU, intra-prediction processing unit 126 may extend values of samples from sample blocks of neighboring PUs across the predictive blocks of the PU in directions associated with the intra prediction modes. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the coding blocks (e.g., luma, Cb and Cr coding blocks) of a CU and the selected predictive sample blocks (e.g., predictive luma, Cb and Cr blocks) of the PUs of the CU, residual blocks (e.g., luma, Cb and Cr residual blocks) of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, in some examples, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU.

By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In some examples, residual coding is not performed with palette coding. Accordingly, video encoder 20 may not perform transformation or quantization when coding using a palette coding mode. In addition, video encoder 20 may entropy encode data generated using a palette coding mode separately from residual data.

Figure 3:
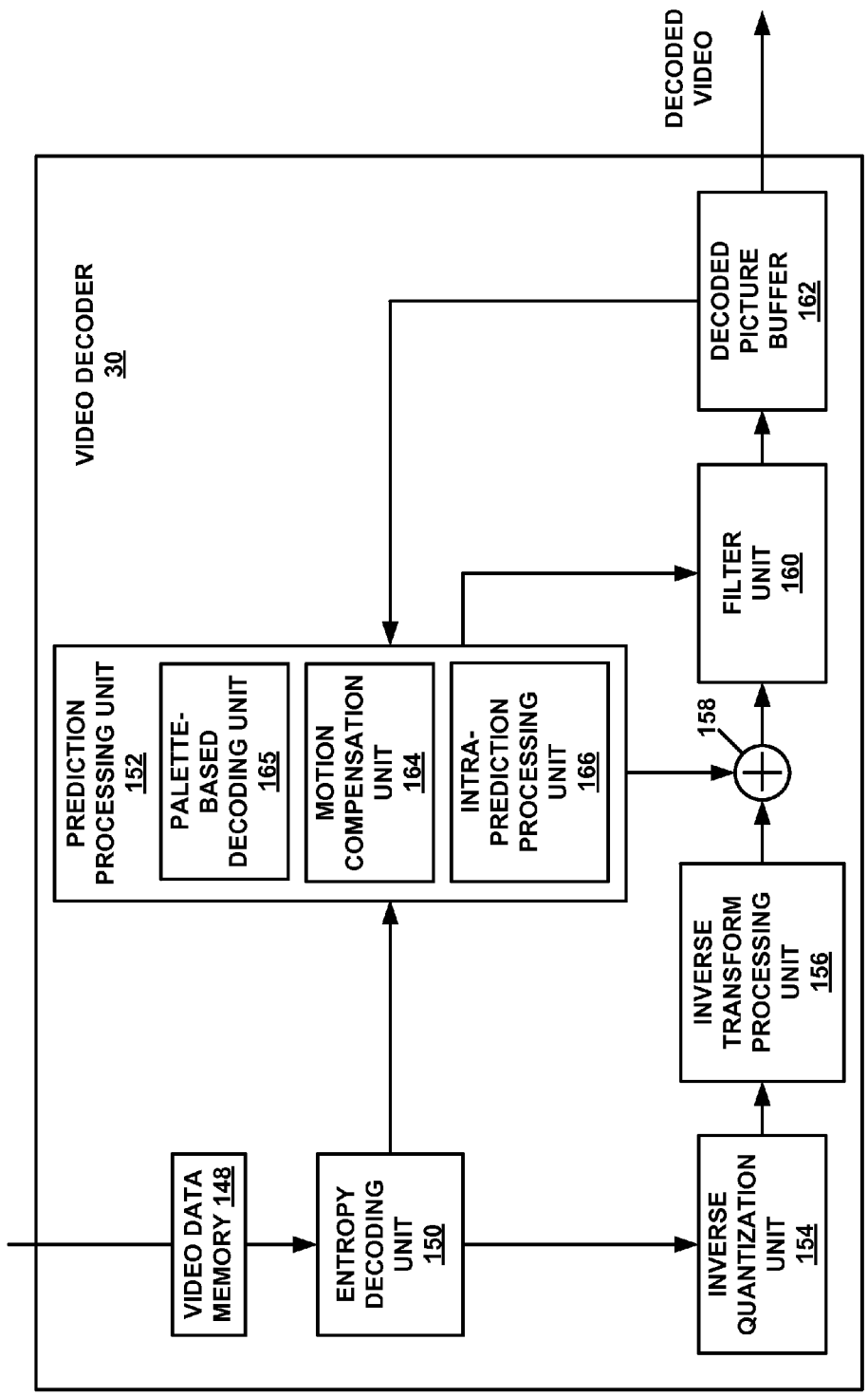
FIG. 3 is a block diagram illustrating an example of a video decoder that may utilize techniques described in this disclosure for palette-based video coding.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes a video data memory 148, an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

Video data memory 148 may store video data, such as an encoded video bitstream, to be decoded by the components of video decoder 30. The video data stored in video data memory 148 may be obtained, for example, from computer-readable medium 16, e.g., from a local video source, such as a camera, via wired or wireless network communication of video data, or by accessing physical data storage media. Video data memory 148 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 148 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 148 and decoded picture buffer 162 may be provided by the same memory device or separate memory devices. In various examples, video data memory 148 may be on-chip with other components of video decoder 30, or off-chip relative to those components.

Video data memory 148, i.e., a CPB, may receive and store encoded video data (e.g., NAL units) of a bitstream. Entropy decoding unit 150 may receive encoded video data (e.g., NAL units) from video data memory 148 and may parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained (e.g., extracted) from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive blocks (e.g., predictive luma, Cb and Cr blocks) for the PU.

Reconstruction unit 158 may use the transform blocks (e.g., luma, Cb and Cr transform blocks) associated with TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) of the CU. For example, reconstruction unit 158 may add samples of the transform blocks (e.g., luma, Cb and Cr transform blocks) to corresponding samples of the predictive blocks (e.g., predictive luma, Cb and Cr blocks) to reconstruct the coding blocks (e.g., luma, Cb and Cr coding blocks) of the CU.

Filter unit 160 may perform a deblocking operation to reduce blocking artifacts associated with the coding blocks (e.g., luma, Cb and Cr coding blocks) of the CU. Video decoder 30 may store the coding blocks (e.g., luma, Cb and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks (e.g., luma, Cb and Cr blocks) in decoded picture buffer 162, intra prediction or inter prediction operations on PUs of other CUs. In this way, video decoder 30 may extract, from the bitstream, transform coefficient levels of a significant coefficient block, inverse quantize the transform coefficient levels, apply a transform to the transform coefficient levels to generate a transform block, generate, based at least in part on the transform block, a coding block, and output the coding block for display.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configured to generate a palette having entries indicating pixel values. Furthermore, in this example, palette-based decoding unit 165 may receive information associating at least some positions of a block of video data with entries in the palette. In this example, palette-based decoding unit 165 may select pixel values in the palette based on the information. Additionally, in this example, palette-based decoding unit 165 may reconstruct pixel values of the block based on the selected pixel values. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, palette-based decoding unit 165 decodes the block of video data using a non-palette based coding mode, e.g., such an HEVC inter-predictive or intra-predictive coding mode, when the palette coding mode information indicates that the palette coding mode does not apply to the block. The block of video data may be, for example, a CU or PU generated according to an HEVC coding process. A video decoder 30 may decode some blocks with inter-predictive temporal prediction or intra-predictive spatial coding modes and decode other blocks with the palette-based coding mode. The palette-based coding mode may comprise one of a plurality of different palette-based coding modes, or there may be a single palette-based coding mode.

According to one or more of the techniques of this disclosure, video decoder 30, and specifically palette-based decoding unit 165, may perform palette-based video decoding of palette-coded video blocks. As described above, a palette decoded by video decoder 30 may be explicitly encoded and signaled by video encoder 20, reconstructed by video decoder 30 with respect to a received palette-coded block, predicted from previous palette entries, predicted from previous pixel values, or a combination thereof.

Figure 4:
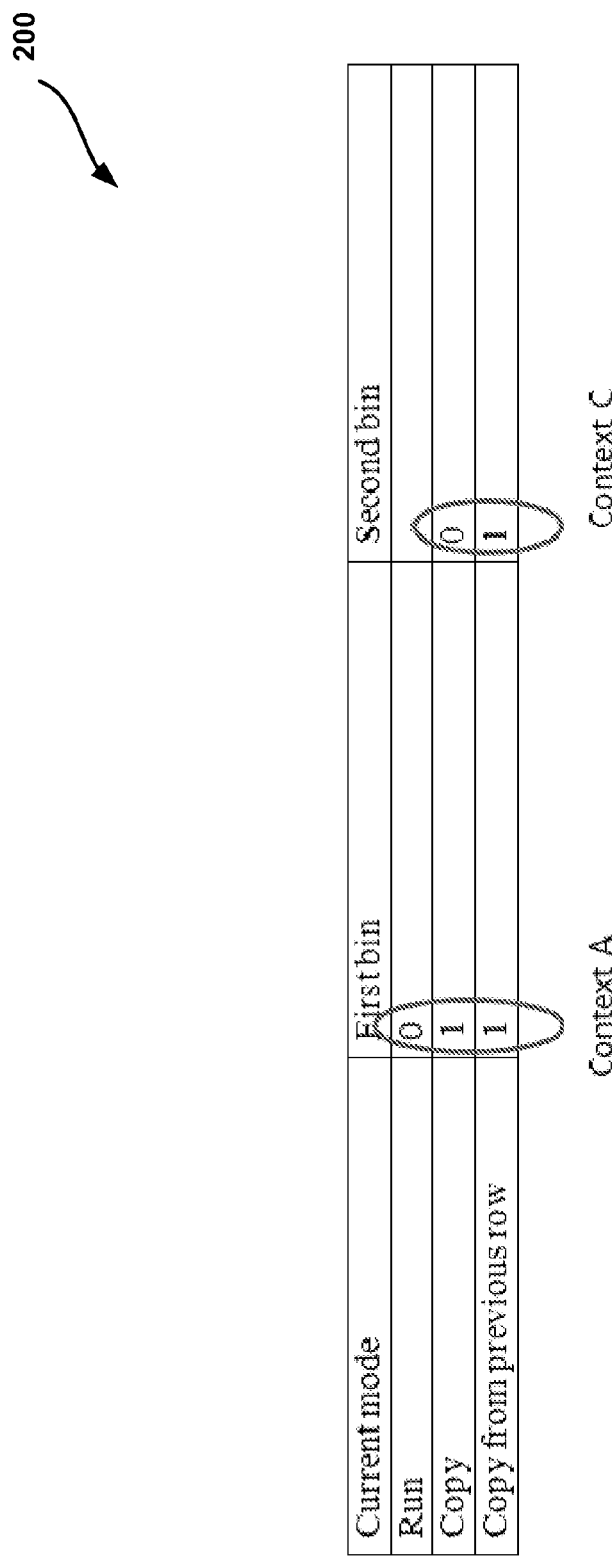
FIG. 4 is a table illustrating an example of context coding assignment for bins of a mode-identifying symbol, consistent with techniques of this disclosure.

FIG. 4 is a table 200 illustrating an example of context coding assignment for two bins of a mode-identifying symbol in cases where video encoder 20 and video decoder 30 support the copy from previous rows mode of this disclosure. In the scenario illustrated in FIG. 4, the above neighboring pixel of the current pixel was previously coded according to run mode. Additionally, in the example illustrated in FIG. 4, video encoder 20 and/or video decoder 30 may determine the context of the first bin of the truncated unary codeword dynamically, based on the coding mode that was used for the previously-coded neighboring pixel. For instance, if the previously-coded neighboring pixel was coded using run mode, video encoder 20 and/or video decoder 30 may code the first bin using a single CABAC context, referred to herein as "context A." As shown in FIG. 4, context A includes possible contexts for each of the run, copy, and copy from previous rows modes. In the particular example of table 200, video encoder 20 and video decoder 30 use a shared context, namely the value of one (1) for both of the copy and copy from previous rows modes.

In contrast, to code the second bin of the truncated unary codeword, video encoder 20 and/or video decoder 30 may use a context that does not depend on the palette-based coding mode used for the previously-coded neighboring pixel. Thus, video encoder 20 and/or video decoder 30 may code the second bin of the truncated unary codeword independently of mode-identify information pertaining to either of the previously-coded neighboring pixels. For instance, the second bin may remain constant in view of changing mode information pertaining to either of the previously-coded neighboring pixels. The CABAC context that video encoder 20 and/or video decoder 30 may use to code the second bin of the truncated unary codeword is referred to herein as "context C."

In the particular example of table 200, the previously-coded above neighboring pixel was coded according to run mode. In this example, video encoder 20 and video decoder 30 may eliminate the run mode in determining possible contexts to code the second bin of the truncated unary codeword. As shown in FIG. 4, table 200 does not include a value for context C to correspond to the run mode.

FIG. 5 is a conceptual diagram illustrates an example palette-coded block 300 for which video encoder 20 and video decoder 30 may implement one or more of the constraints described herein. Palette-coded block 300 includes a current starting pixel 302, a reference starting pixel 304, a previously-coded neighbor pixel 306, and a left neighbor reference pixel 308. Reference starting pixel 304 is the first pixel of a corresponding run, and the remaining pixels of the run are illustrated with a common shading scheme with reference starting pixel 304 in FIG. 5. Current starting pixel 302 is the first pixel of a corresponding run, and the remaining pixels of the run are illustrated with a common shading scheme with current starting pixel 302 in FIG. 5.

For instance, video decoder 30 may determine a palette for decoding palette-coded block 300, where the palette includes one or more palette entries each having a respective palette index. Additionally, video decoder 30 may determine a reference run of palette indices for those pixels of palette-coded block 300, starting at reference starting pixel 304, and terminating at the end of a predetermined run length. Video decoder 30 may use the reference run of palette indices to determine a current run of palette indices within palette-coded block 300, where the current run starts at current starting pixel 302, and terminates at the end of the predetermined run length.

More specifically, to determine the current run, video decoder 30 may locate the palette index for reference starting pixel 304 that begins the reference run. As shown, the index of reference starting pixel 304 is spaced at least one line from current starting pixel 302. Additionally, video decoder 30 may determine a run length of the reference run, where a final index of the reference run is separated in the block from the index of current starting pixel 302 by at least one index. Video decoder 30 device may copy the indices included in the reference run as the current run of palette indices, and decode the pixels of the block mapped to the copied current run of palette indices using the palette.

In some examples, video encoder 20 and video decoder 30 may determine that neighbor pixel 306 was coded in the copy from previous rows mode, and that the palette index for left neighbor pixel 306 was copied from neighbor reference pixel 308. As shown, in the example of palette-coded block 300, neighbor reference pixel 308 is positioned three (3) rows above the row that includes left neighbor pixel 306 and current starting pixel 302. More specifically, left neighbor pixel 306 and current starting pixel 302 are positioned in the fifth row (with row number 4) of palette-coded block 300, while neighbor reference pixel 308 is positioned in the second row (with row number 1) of palette-coded block 300.

Applying the constraints of this disclosure, video encoder 20 and video decoder 30 may determine that current starting pixel 302, if coded according to the copy from previous rows mode, cannot inherit an index from the same (i.e., second) row that includes neighbor reference pixel 308. For instance, video encoder 20 and video decoder 30 may determine that a pixel of the second row that is in the same column as current starting pixel 302 is in the same run as neighbor reference pixel 308. In turn, video encoder 20 and video decoder 30 may determine that the potential reference pixel, which is in the same run as neighbor reference pixel 308, does not provide a unique palette index to inherit for current starting pixel 302. Thus, video encoder 20 and video decoder 30 may determine that a reference pixel for current starting pixel 302 is positioned in a row that precedes the row that includes neighbor reference pixel 308.

In the particular example of palette-coded block 300, the only row that precedes the row of neighbor reference pixel 308 is the first row (with row number 0) of palette-coded block 300. Thus, video encoder 20 and video decoder 30 may identify reference starting pixel 304 by locating the intersection of the first row and the fifth column which includes current starting pixel 302. Thus, FIG. 5 illustrates an example in which current pixel 302 is palette-coded according to the copy from previous rows mode of this disclosure, such that the corresponding reference pixel (reference starting pixel 304 in this case) is included in row 0.

In the particular example of FIG. 5, the matching length of a reference pixel run and a current pixel run is six (6) pixels. Video encoder 20 may copy six (6) consecutive indices, beginning at the index for reference starting pixel 304, to the indices for a corresponding run of six (6) pixels, beginning at current starting pixel 302. Video encoder 20 may encode and signal the matching length of the respective pixel runs to video decoder 30. Additionally, video encoder 20 may encode the matching length of six (6) to video decoder 30.

Video decoder 30 may use the signaled information indicating that current starting pixel 302 is encoded in the copy from previous rows mode, as well as the signaled matching length, to reconstruct the palette-coded block 300. For instance, video decoder 30 may copy the indices for the six (6) pixel-long run beginning at reference starting pixel 304 to the six (6) pixel-long run beginning at current starting pixel 302. In some examples, video encoder 20 may signal the matching length as decremented value. For instance, video encoder 20 may decrement the matching length by a minimum value for the matching length. In such examples, video decoder 30 may reconstruct the matching length by incrementing the received value by the predetermined minimum value for the matching length.

By constraining the number of possible rows from which a reference pixel can be selected for a current pixel in the manner described, video encoder 20 and video decoder 30 may implement the techniques of this disclosure to conserve computing resources while maintaining picture precision. More specifically, video encoder 20 and video decoder 30 may limit the number of rows to be searched, thereby reducing memory accesses and processing clock cycle requirements. Additionally, by using the decremented matching length value as described above, video encoder 20 and video decoder 30 may implement the techniques of this disclosure to conserve bitrate and computing resources to obtain the matching length while maintaining picture precision.

Figure 6:
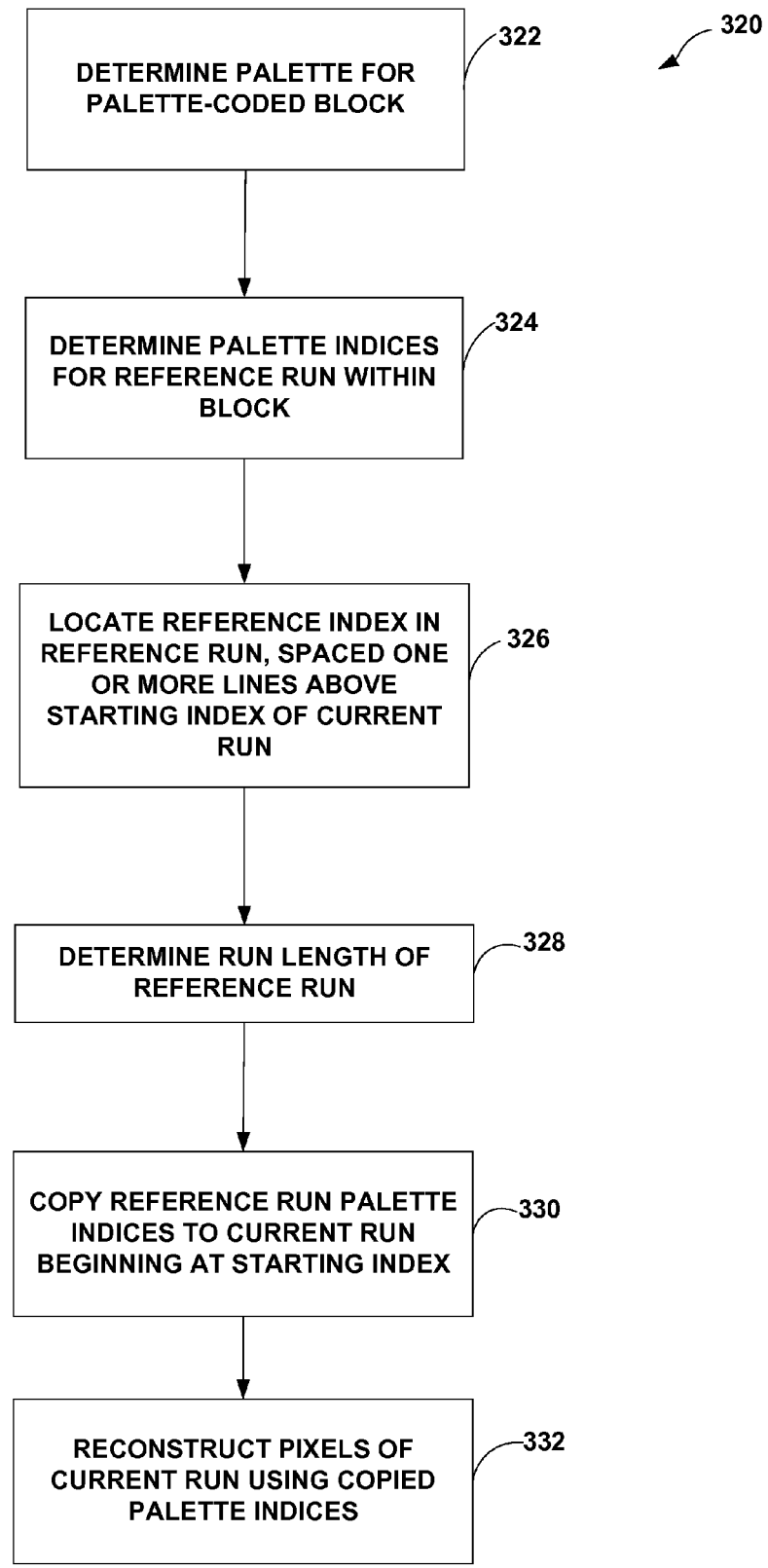
FIG. 6 is a flowchart illustrating an example process by which a video decoding device may perform one or more palette-based decoding techniques of this disclosure.

FIG. 6 is a flowchart illustrating an example process 320 by which a video decoding device may perform one or more palette-based decoding techniques of this disclosure. While process 320 may be performed by a variety of devices in accordance with aspects of this disclosure, process 320 is described herein with respect to video decoder 30 of FIGS. 1 and 3, for the purpose of ease of description.

In the example of FIG. 6, video decoder 30 determines a palette for a palette-coded block (322). In various examples, video decoder 30 may independently determine the palette for a palette-encoded block received in a bitstream, copy the palette from another palette-coded block, or receive the palette itself in the bitstream.

Additionally, video decoder 30 may determine palette indices for a reference run within the palette-coded block (324). For instance, video decoder 30 may reconstruct the palette indices for a first consecutive series of pixels, which may, in turn, serve as a run of reference pixels for one or more subsequent series of pixels.

Video decoder 30 may locate a reference index in the reference run, such that the reference index spaced one or more lines above a starting index of a current run (326). For instance, the palette index for a pixel currently being decoded may serve as the starting index of the current run. Additionally, the palette index of the first pixel in the reference run may serve as the reference index. Applied to the example of palette-coded block 300 of FIG. 5, video decoder 30 may identify the palette index for reference starting pixel 308 as the reference index, and the palette index of current starting pixel 302 as the starting pixel of the current run.

Video decoder 30 may determine the run length of the reference run (328). According to various examples, video decoder 30 may use the run length to determine a number of consecutive indices of the reference run to copy to the current run. For instance, video decoder 30 may determine that the run length equals a matching length signaled in an encoded video bitstream received from video encoder 20. In turn, video decoder 30 copy the palette indices of the reference run, starting at the reference index and counting up to the run length, to the current run (330). More specifically, video decoder 30 may determine the current run to begin at the starting pixel, counting up to the determined run length. Additionally, video decoder 30 may reconstruct the pixels of the current run using color information identified by the respective copied palette indices (332).

Thus, in various examples, this disclosure is directed to a method of decoding video data, the method including determining a palette for decoding a block of video data, where the palette includes one or more palette entries each having a respective palette index, determining a first plurality of palette indices for first pixels of the block of video data, and determining a second plurality of palette indices for second pixels of the block of video data based on the first plurality of palette indices. According to some implementations of the method, determining the second plurality of palette indices includes locating a reference index included in the first plurality of palette indices, where the reference index is spaced at least one line from an initial index of the second plurality of palette indices, determining a run length of a run of the first plurality of indices, where a final index of the run is separated in the block from the initial index of the second plurality of palette indices by at least one index, copying the first plurality of indices included in the run as the second plurality of palette indices, and decoding a plurality of pixels of the block associated with the copied second plurality of palette indices using the palette.

According to some implementations of the method, locating the reference index includes locating the reference index within a search range of the block. In one such implementation, the search range includes a subset of palette indices that correspond to at least two lines of the block. In another such implementation, the method further includes obtaining the search range by decoding a codeword representing the search range. According to some examples, the codeword is expressed in a truncated unary format.

In some example implementations of the method, the final index of the run is separated in the block from an initial index of the second plurality of palette indices by at least one line of indices. According to some example implementations, the method may further include determining a palette-based coding mode associated with a neighboring index, the neighboring index being positioned adjacent to the initial index of the second plurality of palette indices and, if the palette-based coding mode associated with the neighboring index includes a copy from previous rows mode, determining that the reference index is spaced at least one line from a neighbor reference index, where the neighboring index is copied from the neighbor reference index. In one such example, the neighbor reference index is positioned at least two lines above the neighboring index, and the reference index is positioned at least one line above the neighbor reference index. In another such example, the method may further include constraining a search range of the block within which to locate the reference index.

In some examples, determining the run length includes determining a matching length between the first plurality of palette indices and the second plurality of palette indices, the run length indicating a number of consecutive matching indices between the first plurality and the second plurality. In some examples, copying the first plurality of indices included in the run as the second plurality of palette indices includes copying the first plurality of palette indices based on the matching length between the first plurality of palette indices and the second plurality of palette indices. According to one such example, the method further includes receiving, in an encoded video bitstream, a decremented value of the matching length.

In various examples, the method is executable on a wireless communication device that includes a memory configured to store the video data, a processor configured to execute instructions to process the video data stored in the memory, and a receiver configured to receive the block of video data. In some examples, the wireless communication device is a cellular telephone and the block of video data to be decoded is received by the receiver and modulated according to a cellular communication standard. The decoding techniques described herein may be implemented, in various examples, by a computer-readable storage medium or computer-readable storage device encoded with instructions that, when executed, cause one or more processors of a video decoding device to perform any one or more of the techniques, or any combination thereof. The decoding techniques described herein may be implemented, in various examples, by a device that includes a memory configured to store encoded video data, and one or more processors configured to perform any one or more of the techniques, or any combination thereof.

Figure 7:
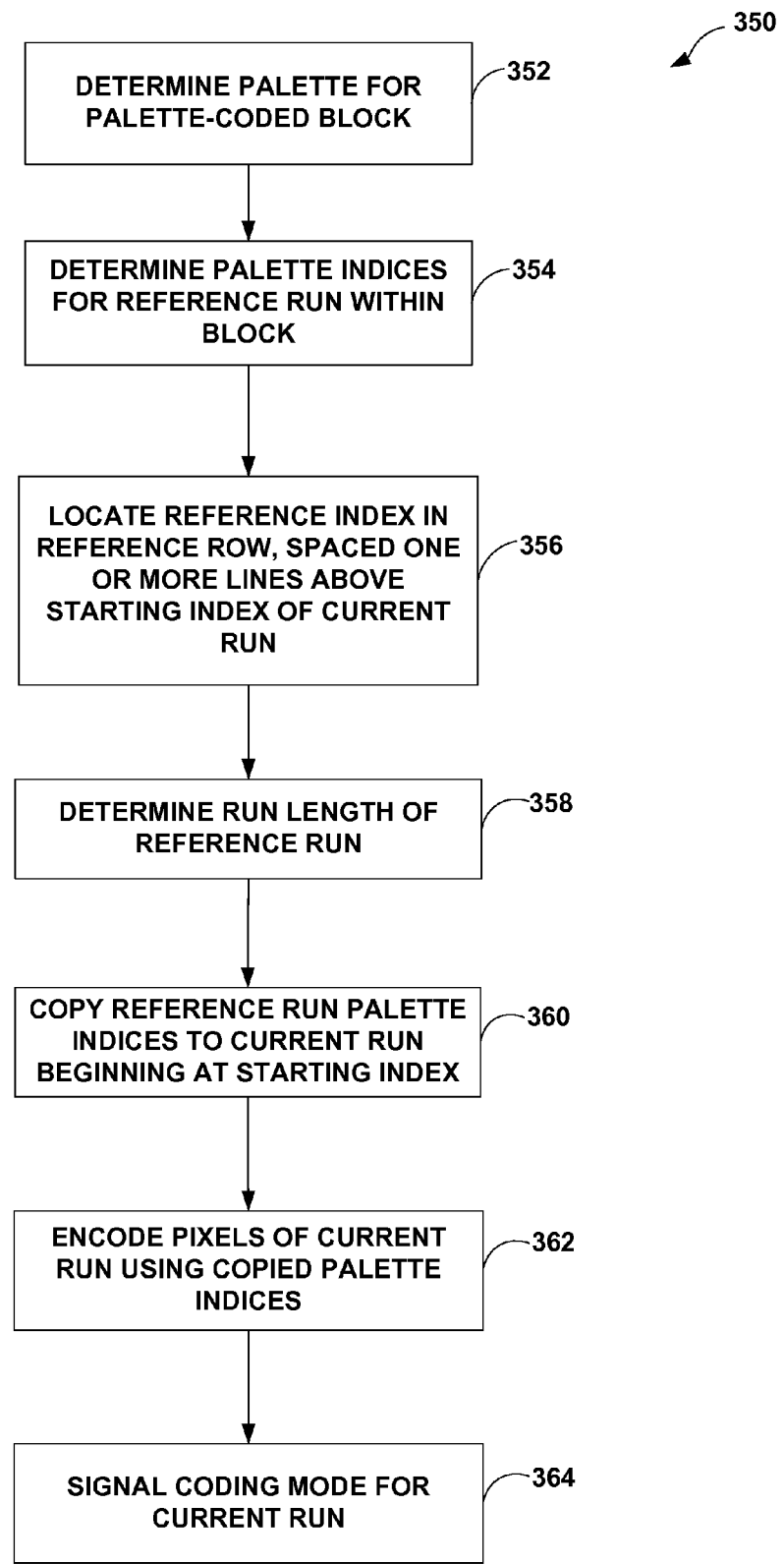
FIG. 7 is a flowchart illustrating an example process by which a video encoding device may perform one or more palette-based encoding techniques of this disclosure.

FIG. 7 is a flowchart illustrating an example process 350 by which a video encoding device may perform one or more palette-based decoding techniques of this disclosure. While process 350 may be performed by a variety of devices in accordance with aspects of this disclosure, process 350 is described herein with respect to video encoder 20 of FIGS. 1 and 2, for the purpose of ease of description.

In the example of FIG. 7, video encoder 20 determines a palette for a palette-coded block (352). In various examples, video encoder 20 may construct a new palette for a palette-encoded block, or copy the palette from another palette-coded block, or determine the palette in other ways consistent with palette-based video coding techniques.

Additionally, video encoder 20 may determine palette indices for a reference run within the palette-coded block (354). For instance, video encoder 20 may assign the palette indices for a first consecutive series of pixels, which may, in turn, serve as a run of reference pixels for one or more subsequent series of pixels.

Video encoder 20 may locate a reference index in the reference run, such that the reference index spaced one or more lines above a starting index of a current run (356). For instance, the palette index for a pixel currently being encoded may serve as the starting index of the current run. Additionally, the palette index of the first pixel in the reference run may serve as the reference index. Applying the example of palette-coded block 300 of FIG. 5, video encoder 20 may identify the palette index for reference starting pixel 308 as the reference index, and the palette index of current starting pixel 302 as the starting pixel of the current run.

Video encoder 20 may determine the run length of the reference run (358). According to various examples, video encoder 20 may use the run length to determine a number of consecutive indices of the reference run to copy to the current run. In turn, video encoder 20 copy the palette indices of the reference run, starting at the reference index and counting up to the run length, to the current run (360). More specifically, video encoder 20 may determine the current run to begin at the starting pixel, counting up to the determined run length. Video encoder 20 may encode the pixels of the current run by copying palette indices from the reference run, to identify color information for each respective pixel using the palette (362). Additionally, video encoder 20 may signal the coding mode (e.g., in the form of a truncated unary codeword) to video decoder 30 (364). By signaling information that identifies the palette-based coding mode, video encoder 20 may enable video decoder 30 to implement reciprocal techniques to reconstruct the current run. For example, in cases where video encoder 20 signals a codeword to identify the copy from previous rows mode for the current starting pixel, video decoder 30 may use the signaled information to copy the palette indices of the reference run to the current run, thereby improving coding efficiency while maintaining coding precision.

In some examples, this disclosure discloses method of encoding video data, the method including determining a palette for decoding a block of video data, where the palette includes one or more palette entries each having a respective palette index, determining a first plurality of palette indices for first pixels of the block of video data, and determining a second plurality of palette indices for second pixels of the block of video data based on the first plurality of palette indices. According to these example methods, determining the second plurality of palette indices includes locating a reference index included in the first plurality of palette indices, where the reference index is spaced at least one line from an initial index of the second plurality of palette indices, determining a run length of a run of the first plurality of indices, where a final index of the run is separated in the block from the initial index of the second plurality of palette indices by at least one index, copying the first plurality of indices included in the run as the second plurality of palette indices, and encoding a plurality of pixels of the block associated with the copied second plurality of palette indices using the palette.

In some examples, locating the reference index includes locating the reference index within a search range of the block. According to one such example, the search range includes a subset of palette indices that correspond to at least two lines of the block. In some examples, the method further includes encoding a codeword that represents the search range and signaling the encoded codeword in an encoded video bitstream. According to one such example, encoding the codeword includes encoding the codeword in a truncated unary format.

According to some example implementations of the method, the final index of the run is separated in the block from an initial index of the second plurality of palette indices by at least one line of indices. In some examples, the method may further include determining a palette-based coding mode associated with a neighboring index, the neighboring index being positioned adjacent to the initial index of the second plurality of palette indices and, if the palette-based coding mode associated with the neighboring index includes a copy from previous rows mode, determining that the reference index is spaced at least one line from a neighbor reference index, where the neighboring index is copied from the neighbor reference index. In one such example, the neighbor reference index is positioned at least two lines above the neighboring index, and the reference index is positioned at least one line above the neighbor reference index. In other such examples, the method may further include constraining a search range of the block within which to locate the reference index. According to one such example, determining the run length includes determining a matching length between the first plurality of palette indices and the second plurality of palette indices, the run length indicating a number of consecutive matching indices between the first plurality and the second plurality, and copying the first plurality of indices included in the run as the second plurality of palette indices includes copying the first plurality of palette indices based on the matching length between the first plurality of palette indices and the second plurality of palette indices. According to one implementation, the method further includes signaling, in an encoded video bitstream, a decremented value of the matching length.

In various examples, the method may be executable on a wireless communication device that includes a memory configured to store the video data, a processor configured to execute instructions to process the video data stored in the memory, and a transmitter configured to transmit encoded video data representing the block. In one such example, the wireless communication device is a cellular telephone and the encoded video data transmitted by the transmitter and modulated according to a cellular communication standard. The encoding techniques described herein may be implemented, in various examples, by a computer-readable storage medium or computer-readable storage device encoded with instructions that, when executed, cause one or more processors of a video encoding device to perform any one or more of the techniques, or any combination thereof. The encoding techniques described herein may be implemented, in various examples, by a device that includes a memory configured to store video data, and one or more processors configured to perform any one or more of the techniques, or any combination thereof.

Figure 8:
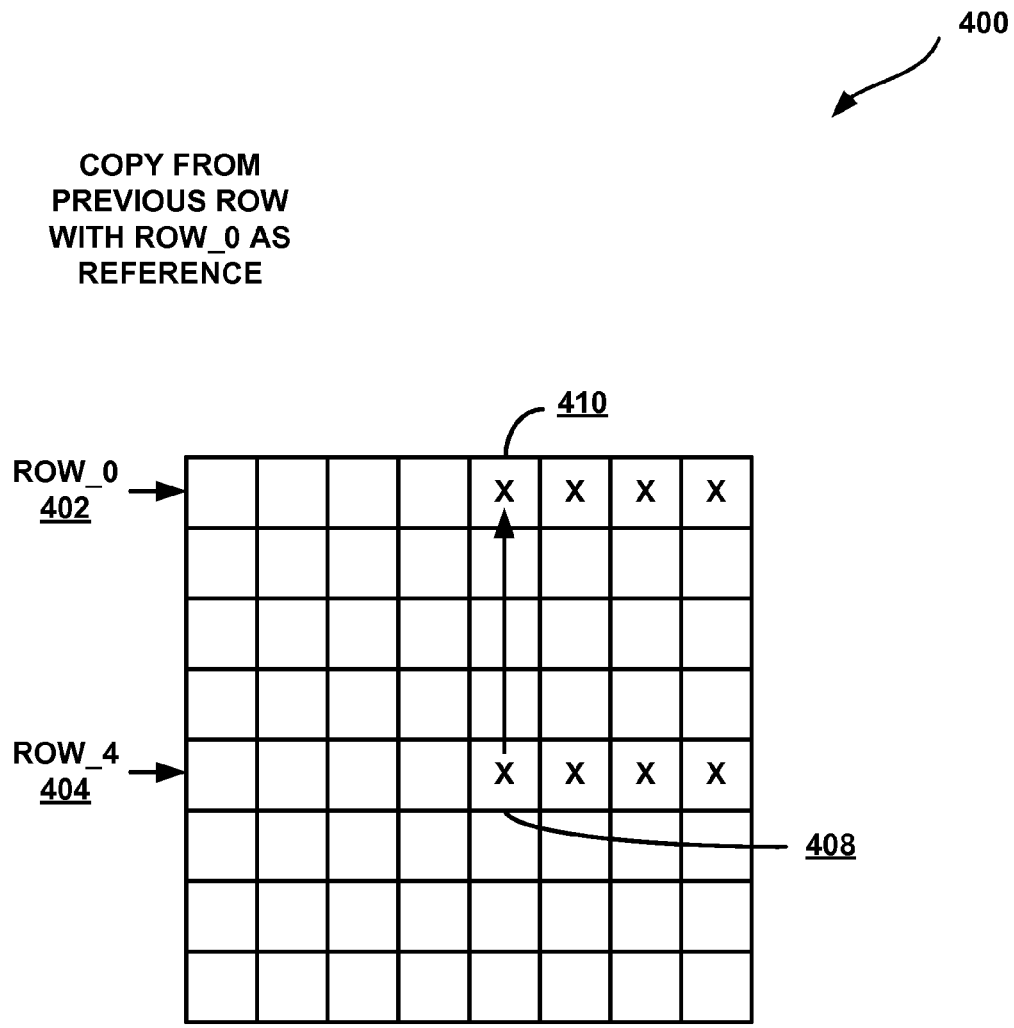
FIG. 8 is a conceptual diagram illustrating another example of a block that a video encoder and/or a video decoder may code using the copy from previous rows mode of this disclosure.

FIG. 8 is a conceptual diagram illustrating another example of a block that video encoder 20 and/or video decoder 30 may code using the copy from previous rows mode of this disclosure. Current CU 400 includes several rows of pixels, including row_0 402 and row_4 404. As shown, row_4 404 includes a run of four pixels currently being coded (as marked with an X, starting with pixel 408) relative to four previously coded pixels of row_0 402, referred to as a reference run (as marked with an X, starting with reference pixel 410). In some examples, to code current CU 400, video encoder 20 and/or video decoder 30 may copy the palette indices for the reference run in row_0 402, beginning with reference pixel 410 to the corresponding pixels of the current run, beginning with pixel 408. In the specific example of FIG. 8, the matching run length between the reference run and the current run is four, meaning that to code current CU 400, video encoder 20 and video decoder 30 may copy a string of four consecutive palette indices from the reference run to the current run.

Hence, in the example of FIG. 8, video encoder 20 and video decoder 30 may determine a first plurality of palette indices for first pixels of the block of video data, e.g., the indices associated with the four marked pixels of row_0 402. In addition, video encoder 20 and video decoder 30 may enable a palette coding mode (e.g., the copy from above mode) based on the run length of the current run (the run of four pixels starting at pixel 408) meeting a run length threshold. In the example shown in FIG. 8, the run length threshold may be four, such that video encoder 20 and video decoder 30 may use the palette coding mode for the current run, but may disable the palette coding mode for relatively shorter runs. Video encoder 20 and video decoder 30 may code the current run relative to the first plurality of palette indices using the palette coding mode.

Figure 9:
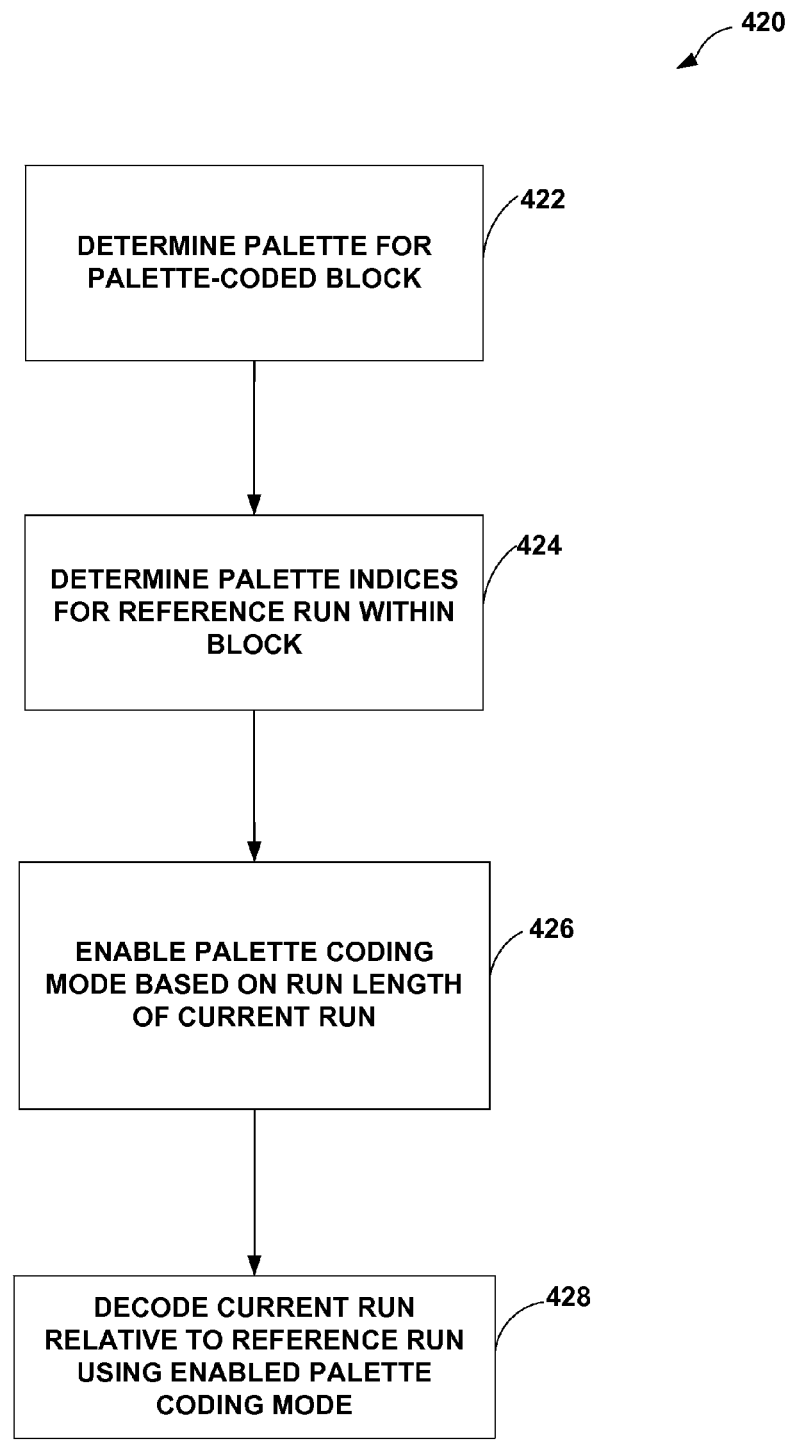
FIG. 9 is a flowchart illustrating an example process by which a video decoding device may perform one or more palette-based decoding techniques of this disclosure.

FIG. 9 is a flowchart illustrating an example process 420 by which a video decoding device may perform one or more palette-based decoding techniques of this disclosure. While process 420 may be performed by a variety of devices in accordance with aspects of this disclosure, process 420 is described herein with respect to video decoder 30 of FIGS. 1 and 3, for the purpose of ease of description.

In the example of FIG. 9, video decoder 30 determines a palette for a palette-coded block (422). In various examples, video decoder 30 may independently determine the palette for a palette-encoded block received in a bitstream, copy the palette from another palette-coded block, or receive the palette itself in the bitstream.

Additionally, video decoder 30 may determine palette indices for a reference run within the palette-coded block (424). For instance, video decoder 30 may reconstruct the palette indices for a first consecutive series of pixels, which may, in turn, serve as a run of reference pixels for one or more subsequent series of pixels.

Video decoder 30 may enable a particular palette coding mode based on the run length of the current run (426). For instance, if the run length meets (e.g., is equal to greater than) a threshold run length, video decoder 30 may enable the copy from previous rows mode with respect to the current run. Video decoder 30 may decode the pixels of the current run using the enabled palette coding mode (428). For example, where the enabled mode is the copy from previous rows mode, video decoder 30 may decode the current run according to process 320 illustrated in FIG. 6.

Thus, in various examples, this disclosure is directed to a method of decoding video data, the method including determining a palette for decoding a block of video data, where the palette includes one or more palette entries each having a respective palette index, determining a first plurality of palette indices for first pixels of the block of video data, enabling a palette coding mode based on a run length of a run of a second plurality of palette indices for second pixels of the block of video data being decoded relative to the first plurality of palette indices meeting a run length threshold, and decoding the run of the second plurality of palette indices relative to the first plurality of palette indices using the palette coding mode. In some examples, the method may further include determining a difference between the run length and the run length threshold and adding the difference to the run length threshold to determine the run length of the run. In one such example, determining the difference includes decoding one or more syntax elements that represent the difference from an encoded video bitstream. In another such example, the run length threshold includes a constant run length threshold value that is not indicated by syntax elements in an encoded bitstream.

According to some example implementations, the method further includes determining the run length threshold using a look-up table based on a reference row offset and a starting palette index of the second plurality of palette indices. In some examples, decoding the run of the second plurality of palette indices relative to the first plurality of palette indices using the palette coding mode includes copying the first plurality of palette indices as the second plurality of palette indices.

In some examples, the method further includes obtaining the run length threshold based on a respective number of binarization bits associated with each of a reference row offset and a starting palette index of the second plurality of palette indices. According to one such example, obtaining the run length threshold based on the respective number of binarization bits associated with each of the reference row offset and the starting palette index of the second plurality of palette indices includes calculating the run length threshold by adding a predetermined constant value to a quotient of the respective binarization bits associated with each of the reference row offset and the starting palette index of the second plurality of palette indices.

According to some examples, the palette mode is a copy from previous rows mode. In one such example, decoding the first plurality of palette indices relative to the second plurality of palette indices using the copy from previous rows mode includes locating a reference index included in the first plurality of palette indices, where the reference index is spaced at least one line from an initial index of the second plurality of palette indices, determining the run length of the run of the first plurality of indices, where a final index of the run is separated in the block from the initial index of the second plurality of palette indices by at least one index, and copying the first plurality of indices included in the run as the second plurality of palette indices. In some examples, the method further includes receiving data indicating a palette-based coding mode associated with the second plurality of palette indices and, based on the received data indicating a value of zero, determining that the palette-based coding mode includes one of a copy from above mode or a copy from previous rows mode.

In various examples, the method is executable on a wireless communication device that includes a memory configured to store the video data, a processor configured to execute instructions to process the video data stored in the memory, and a receiver configured to receive the block of video data. In some examples, the wireless communication device is a cellular telephone and the block of video data to be decoded is received by the receiver and modulated according to a cellular communication standard. The decoding techniques described herein may be implemented, in various examples, by a computer-readable storage medium or computer-readable storage device encoded with instructions that, when executed, cause one or more processors of a video decoding device to perform any one or more of the techniques, or any combination thereof. The decoding techniques described herein may be implemented, in various examples, by a device that includes a memory configured to store encoded video data, and one or more processors configured to perform any one or more of the techniques, or any combination thereof.

Figure 10:
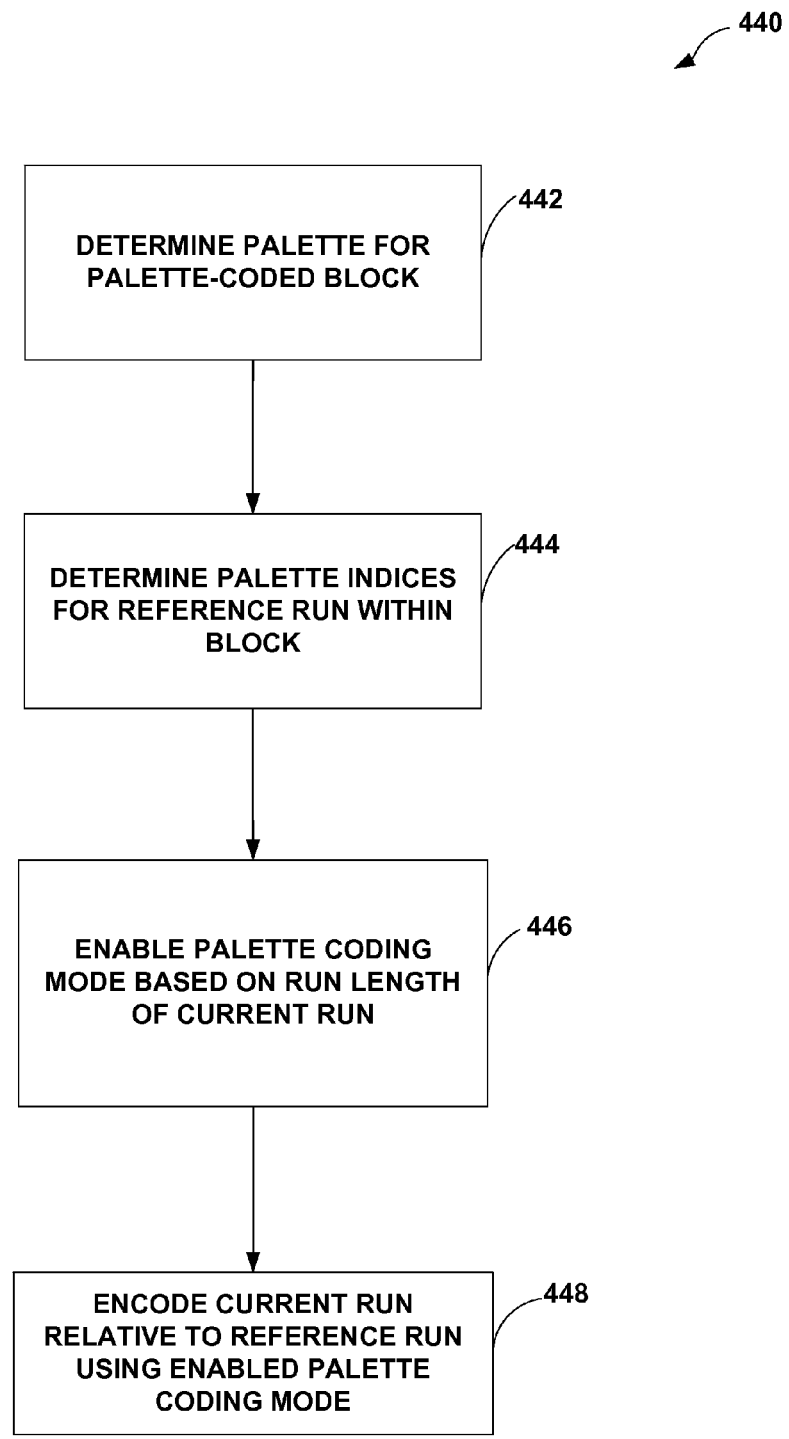
FIG. 10 is a flowchart illustrating an example process by which a video encoding device may perform one or more palette-based encoding techniques of this disclosure.

FIG. 10 is a flowchart illustrating an example process 440 by which a video encoding device may perform one or more palette-based decoding techniques of this disclosure. While process 440 may be performed by a variety of devices in accordance with aspects of this disclosure, process 440 is described herein with respect to video encoder 20 of FIGS. 1 and 2, for the purpose of ease of description.

In the example of FIG. 10, video encoder 20 determines a palette for a palette-coded block (442). In various examples, video encoder 20 may independently determine the palette for a palette-encoded block, copy the palette from another palette-coded block, or determine the palette according various other techniques of palette-based coding.

Additionally, video encoder 20 may determine palette indices for a reference run within the palette-coded block (444). For instance, video encoder 20 may encode the palette indices for a first consecutive series of pixels, which may, in turn, serve as a run of reference pixels for one or more subsequent series of pixels.

Video encoder 20 may enable a particular palette coding mode based on the run length of the current run (446). For instance, if the run length meets (e.g., is equal to greater than) a threshold run length, video encoder 20 may enable the copy from previous rows mode with respect to the current run. Video encoder 20 may encode the pixels of the current run using the enabled palette coding mode (448). For example, where the enabled mode is the copy from previous rows mode, video encoder 20 may encode the current run according to process 350 illustrated in FIG. 7.

Thus, in various examples, this disclosure is directed to a method of encoding video data, the method including determining a palette for decoding a block of video data, where the palette includes one or more palette entries each having a respective palette index, determining a first plurality of palette indices for first pixels of the block of video data, enabling a palette coding mode based on a run length of a run of a second plurality of palette indices for second pixels of the block of video data being encoded relative to the first plurality of palette indices meeting a run length threshold, and encoding the run of the second plurality of palette indices relative to the first plurality of palette indices using the palette coding mode. In some examples, the method further includes determining a difference between the run length and the run length threshold, and signaling syntax elements that represent the difference in an encoded video bitstream.

In some examples, the run length threshold includes a constant run length threshold value that is not indicated by syntax elements in an encoded bitstream. According to some example implementations, the method includes determining the run length threshold using a look-up table based on a reference row offset and a starting palette index of the second plurality of palette indices. In some examples, encoding the run of the second plurality of palette indices relative to the first plurality of palette indices using the palette coding mode includes copying the first plurality of palette indices as the second plurality of palette indices.

According to some example implementations, the method further includes obtaining the run length threshold based on a respective number of binarization bits associated with each of a reference row offset and a starting palette index of the second plurality of palette indices. In one such implementation, obtaining the run length threshold based on the respective number of binarization bits associated with each of the reference row offset and the starting palette index of the second plurality of palette indices includes calculating the run length threshold by adding a predetermined constant value to a quotient of the respective binarization bits associated with each of the reference row offset and the starting palette index of the second plurality of palette indices.

In some instances, the method further includes signaling the run length threshold in the encoded video bitstream. According to some examples, the palette mode is a copy from previous rows mode. In one such example, encoding the first plurality of palette indices relative to the second plurality of palette indices using the copy from previous rows mode includes locating a reference index included in the first plurality of palette indices, where the reference index is spaced at least one line from an initial index of the second plurality of palette indices, determining a run length of a run of the first plurality of indices, where a final index of the run is separated in the block from the initial index of the second plurality of palette indices by at least one index, copying the first plurality of indices included in the run as the second plurality of palette indices, and encoding a plurality of pixels of the block associated with the copied second plurality of palette indices using the palette. In some examples, the method further includes determining that a palette-based coding mode for the second plurality of palette indices includes one of a copy from above mode or a copy from previous rows mode and, based on determining that the palette-based coding mode includes one of the copy from above mode or the copy from previous rows mode, encoding data indicating the palette coding mode to have a value of zero.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable. In addition, video encoding and video decoding may be generically referred to as "processing" video data.

It should be understood that all of the techniques described herein may be used individually or in combination. This disclosure includes several signaling methods which may change depending on certain factors such as block size, palette size, slice type etc. Such variation in signaling or inferring the syntax elements may be known to the encoder and decoder a-priori or may be signaled explicitly in the video parameter set (VPS), sequence parameter set (SPS), picture parameter set (PPS), slice header, at a tile level or elsewhere.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a palette for decoding a block of video data, wherein the palette includes one or more palette entries each having a respective palette index, and wherein each palette entry is associated with respective color information;
   determining a first plurality of palette indices for a first consecutive series of pixels of the block of video data;
   determining that the first consecutive series of pixels forms a reference run with respect to a second consecutive series of pixels of the block of video data according to a palette coding mode;
   determining that a matching run length between the first consecutive series of pixels and the second consecutive series of pixels meets a run length threshold;
   enabling the palette coding mode for the second consecutive series of pixels based on the determination that the matching run length meets the run length threshold and on the determination that the first consecutive series of pixels forms the reference run with respect to the second consecutive series of pixels; and
   decoding a second plurality of palette indices for the second consecutive series of pixels using the first plurality of palette indices, according to the enabled palette coding mode.

2. The method of claim 1, further comprising:
   determining a difference between the matching run length and the run length threshold; and
   adding the difference to the run length threshold to determine a run length of the second consecutive series of pixels.

3. The method of claim 2, wherein determining the difference comprises:
   obtaining one or more syntax elements representing the difference from an encoded video bitstream; and
   reconstructing the syntax elements representing the difference between the matching run length and the run length threshold.

4. The method of claim 2, wherein the run length threshold comprises a constant run length threshold value that is not indicated by syntax elements in an encoded bitstream.

5. The method of claim 1, further comprising determining the run length threshold using a look-up table based on:
   a reference row offset that indicates a number of rows between a starting palette index of the second plurality of palette indices and a final palette index of the first plurality of palette indices.

6. The method of claim 1, wherein decoding the second plurality of palette indices using the first plurality of palette indices according to the palette coding mode comprises copying the first plurality of palette indices to reconstruct the second plurality of palette indices.

7. The method of claim 1, further comprising calculating the run length threshold by adding a predetermined constant value to a quotient of a first number of bits associated with binarizing a truncated binary code representation of a reference row offset and a second number of bits associated with binarizing a truncated binary code representation of a starting palette index of the second plurality of palette indices.

8. The method of claim 1, wherein the enabled palette coding mode is a copy from previous rows mode, and wherein decoding the second plurality of palette indices using the first plurality of palette indices according to the copy from previous rows mode comprises:
locating a reference index associated with an initial pixel of the first consecutive series of pixels, wherein the initial pixel of the first consecutive series of pixels is spaced at least one line from an initial pixel of the second consecutive series of pixels;
determining a run length of the first consecutive series of pixels, wherein a final pixel of the first consecutive series of pixels is separated in the block from an initial pixel of the second consecutive series of pixels by at least one pixel; and
copying the first plurality of palette indices to reconstruct the second plurality of palette indices.

9. The method of claim 1, the method being executable on a wireless communication device, wherein the device comprises:
a memory configured to store the video data;
a processor configured to execute instructions to process the video data stored in the memory; and
a receiver configured to receive the block of video data.

10. The method of claim 9, wherein the wireless communication device is a cellular telephone and the block of video data to be decoded is received by the receiver and modulated according to a cellular communication standard.

11. A method of encoding video data, the method comprising:
determining a palette for decoding a block of video data, wherein the palette includes one or more palette entries each having a respective palette index, and wherein each palette entry is associated with respective color information;
determining a first plurality of palette indices for a first consecutive series of pixels of the block of video data;
determining that the first consecutive series of pixels forms a reference run with respect to a second consecutive series of pixels of the block of video data according to a palette coding mode;
determining that a matching run length between the first consecutive series of pixels and the second consecutive series of pixels meets a run length threshold;
enabling the palette coding mode for the second consecutive series of pixels based on the determination that the matching run length meets the run length threshold and on the determination that the first consecutive series of pixels forms the reference run with respect to the second consecutive series of pixels; and
encoding a second plurality of palette indices for the second consecutive series of pixels using the first plurality of palette indices, according to the enabled palette coding mode.

12. The method of claim 11, further comprising:
determining a difference between the matching run length and the run length threshold; and
signaling syntax elements that represent the difference in an encoded video bitstream.

13. The method of claim 11, further comprising determining the run length threshold using a look-up table based on:

a reference row offset that indicates a number of rows between a starting palette index of the second plurality of palette indices and a final palette index of the first plurality of palette indices.

14. The method of claim 11, wherein encoding the second plurality of palette indices using the first plurality of palette indices according to the palette coding mode comprises copying the first plurality of palette indices to reconstruct the second plurality of palette indices.

15. The method of claim 11, further comprising calculating the run length threshold by adding a predetermined constant value to a quotient of a first number of bits associated with binarizing a truncated binary code representation of a reference row offset and a second number of bits associated with binarizing a truncated binary code representation of a starting palette index of the second plurality of palette indices.

16. The method of claim 11, further comprising signaling the run length threshold in the encoded video bitstream.

17. The method of claim 11, wherein the enabled palette coding mode is a copy from previous rows mode, and wherein encoding the second plurality of palette indices using the first plurality of palette indices according to the copy from previous rows mode comprises:
locating a reference index associated with an initial pixel of the first consecutive series of pixels, wherein the initial pixel of the first consecutive series of pixels is spaced at least one line from an initial pixel of the second consecutive series of pixels;
determining a run length of a first consecutive series of pixels, wherein a final pixel of the first consecutive series of pixels is separated in the block from an initial index of the second consecutive series of pixels by at least one pixel; and
copying the first plurality of palette indices to encode the second plurality of palette indices.

18. The method of claim 11, the method being executable on a wireless communication device, wherein the device comprises:
a memory configured to store the video data;
a processor configured to execute instructions to process the video data stored in the memory; and
a transmitter configured to transmit encoded video data representing the block.

19. The method of claim 18, wherein the wireless communication device is a cellular telephone and the encoded video data transmitted by the transmitter and modulated according to a cellular communication standard.

20. A device for decoding encoded video data, the device comprising:
a memory configured to store at least a portion of the encoded video data; and
one or more processors configured to:
determine a palette for decoding a block of the encoded video data stored to the memory, wherein the palette includes one or more palette entries each having a respective palette index, and wherein each palette entry is associated with respective color information;
determine a first plurality of palette indices for a first consecutive series of pixels of the block of video data;
determine that the first consecutive series of pixels forms a reference run with respect to a second consecutive series of pixels of the block of video data according to a palette coding mode;

determine that a matching run length between the first consecutive series of pixels and the second consecutive series of pixels meets a run length threshold;

enable the palette coding mode for the second consecutive series of pixels based on the determination that the matching run length meets the run length threshold and on the determination that the first consecutive series of pixels forms the reference run with respect to the second consecutive series of pixels; and decode a second plurality of palette indices for the second consecutive series of pixels using the first plurality of palette indices, according to the enabled palette coding mode.

21. The device of claim 20, wherein the device is a wireless communication device, the device further comprising a receiver configured to receive the block of the encoded video data.

22. The device of claim 21, wherein the wireless communication device is a cellular telephone and the block of the encoded video data is received by the receiver and modulated according to a cellular communication standard.

23. A non-transitory computer-readable storage medium encoded with instructions that, when executed, cause one or more processors of a video decoding device to:

determine a palette for decoding a block of encoded video data, wherein the palette includes one or more palette entries each having a respective palette index, and wherein each palette entry is associated with respective color information;

determine a first plurality of palette indices for a first consecutive series of pixels of the block of video data;

determine that the first consecutive series of pixels forms a reference run with respect to a second consecutive series of pixels of the block of video data according to a palette coding mode;

determine that a matching run length between the first consecutive series of pixels and the second consecutive series of pixels meets a run length threshold;

enable the palette coding mode for the second consecutive series of pixels based on the determination that the matching run length meets the run length threshold and on the determination that the first consecutive series of pixels forms the reference run with respect to the second consecutive series of pixels; and decode a second plurality of palette indices for the second consecutive series of pixels using the first plurality of palette indices, according to the enabled palette coding mode.

* * * * *